US012748255B2

(12) United States Patent
Amezcua-Correa et al.

(10) Patent No.: US 12,748,255 B2
(45) Date of Patent: Sep. 29, 2026

(54) ANTI-RESONANT HOLLOW-CORE FIBERS FEATURING SEGMENTED INTERIOR CAVITIES AND NESTED ANTI-RESONANT STRUCTURES

(71) Applicant: University of Central Florida Research Foundation, Inc., Orlando, FL (US)

(72) Inventors: Rodrigo Amezcua-Correa, Orlando, FL (US); Jose Enrique Antonio-Lopez, Orlando, FL (US); Stephanos Yerolatsitis, Orlando, FL (US); Daniel Cruz Delgado, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 183 days.

(21) Appl. No.: 18/731,743

(22) Filed: Jun. 3, 2024

(65) Prior Publication Data

US 2024/0402419 A1 Dec. 5, 2024

Related U.S. Application Data

(60) Provisional application No. 63/470,560, filed on Jun. 2, 2023.

(51) Int. Cl.
*G02B 6/032* (2006.01)

(52) U.S. Cl.
CPC .................................... *G02B 6/032* (2013.01)

(58) Field of Classification Search
None
See application file for complete search history.

(56) References Cited

U.S. PATENT DOCUMENTS 7,346,249 B2 3/2008 Russell et al.
7,529,453 B2 5/2009 Miyabe et al.
(Continued)

FOREIGN PATENT DOCUMENTS

CN 105807363 A 7/2016
CN 108181684 A 6/2018
(Continued)

OTHER PUBLICATIONS

Amrani et al., "Low-loss single-mode hybrid-lattice hollow-core photonic-crystal fibre," Light: Science & Applications, 2021, 12 pages.

(Continued)

*Primary Examiner* — Chris H Chu
(74) *Attorney, Agent, or Firm* — Suiter Swantz IP

(57) ABSTRACT

An optical fiber may include a cladding structure extending along a fiber length providing a hollow interior fiber region and anti-resonant (AR) elements distributed within the interior fiber region. Each of the AR elements may be formed as walled structures with walls extending along the fiber length, where at least some of the plurality of AR elements are nested to form one or more nested sets of AR elements. At least one of the nested sets of AR element may include a first AR element of the plurality of AR elements, where an interior region of the first AR element is segmented into two or more interior cavities by one or more segmentation walls extending along the fiber length. At least one of the two or more interior cavities of the first AR element may include two or more second AR elements of the plurality of AR elements.

46 Claims, 29 Drawing Sheets

(56) References Cited

U.S. PATENT DOCUMENTS

| | | | |
|---|---|---|---|
| 7,590,323 B2 | 9/2009 | Broeng et al. | |
| 9,146,345 B1 | 9/2015 | Dong et al. | |
| 9,904,008 B2 | 2/2018 | Fokoua et al. | |
| 10,139,560 B2 | 11/2018 | Poletti et al. | |
| 10,816,721 B1 | 10/2020 | Chenard et al. | |
| 10,822,262 B2 | 11/2020 | Gibson et al. | |
| 11,009,654 B2 * | 5/2021 | Wang ................. | G02B 6/02328 |
| 11,029,464 B2 | 6/2021 | Bauerschmidt et al. | |
| 11,034,607 B2 | 6/2021 | Fokoua et al. | |
| 11,099,319 B2 | 8/2021 | Uebel et al. | |
| 11,203,547 B2 | 12/2021 | Corrado et al. | |
| 11,209,591 B2 | 12/2021 | Gao et al. | |
| 11,212,005 B1 | 12/2021 | Jopson | |
| 11,215,751 B2 | 1/2022 | Poletti et al. | |
| 11,249,250 B2 | 2/2022 | Jasion et al. | |
| 11,269,135 B2 | 3/2022 | Russell et al. | |
| 11,428,865 B2 | 8/2022 | Jasion et al. | |
| 11,493,684 B2 | 11/2022 | Taranta et al. | |
| 11,493,685 B2 | 11/2022 | Wang et al. | |
| 11,555,958 B2 | 1/2023 | Sakr et al. | |
| 11,640,029 B2 | 5/2023 | Jasion et al. | |
| 11,668,871 B2 | 6/2023 | Poletti | |
| 11,835,755 B2 | 12/2023 | Harker et al. | |
| 2012/0027368 A1 | 2/2012 | Bansal et al. | |
| 2016/0209586 A1 | 7/2016 | Fokoua et al. | |
| 2016/0236964 A1 | 8/2016 | Fokoua et al. | |
| 2017/0160467 A1 | 6/2017 | Poletti et al. | |
| 2018/0356589 A1 | 12/2018 | Mukasa et al. | |
| 2019/0101695 A1 | 4/2019 | Poletti et al. | |
| 2020/0079680 A1 | 3/2020 | Corrado et al. | |
| 2020/0115270 A1 | 4/2020 | Yoo et al. | |
| 2020/0156987 A1 | 5/2020 | Wheeler et al. | |
| 2020/0278491 A1 | 9/2020 | Poletti et al. | |
| 2020/0378864 A1 | 12/2020 | O'Sullivan | |
| 2021/0088717 A1 | 3/2021 | Jasion et al. | |
| 2021/0311248 A1 | 10/2021 | Taranta et al. | |
| 2021/0311250 A1 | 10/2021 | Jasion et al. | |
| 2021/0382227 A1 * | 12/2021 | Wang ..................... | G02B 6/032 |
| 2021/0387892 A1 | 12/2021 | Van Leeuwen et al. | |
| 2021/0396927 A1 | 12/2021 | Harker et al. | |
| 2022/0011501 A1 | 1/2022 | Lyngsoe et al. | |
| 2022/0011502 A1 | 1/2022 | Poletti et al. | |
| 2022/0011644 A1 | 1/2022 | Uebel et al. | |
| 2022/0045470 A1 | 2/2022 | Uebel et al. | |
| 2022/0155517 A1 | 5/2022 | Jasion et al. | |
| 2022/0196907 A1 | 6/2022 | Poletti | |
| 2022/0227656 A1 | 7/2022 | Rosenberger et al. | |
| 2022/0227658 A1 | 7/2022 | Rosenberger et al. | |
| 2022/0234936 A1 | 7/2022 | Rosenberger et al. | |
| 2022/0242773 A1 | 8/2022 | Rosenberger et al. | |
| 2022/0244452 A1 | 8/2022 | Benabid et al. | |
| 2022/0244453 A1 | 8/2022 | Rosenberger et al. | |
| 2022/0252788 A1 | 8/2022 | Bawn | |
| 2022/0267192 A1 | 8/2022 | Rosenberger et al. | |
| 2022/0267193 A1 | 8/2022 | Rosenberger et al. | |
| 2022/0291443 A1 | 9/2022 | Rosenberger et al. | |
| 2022/0317369 A1 | 10/2022 | Sakr et al. | |
| 2022/0356108 A1 | 11/2022 | Rosenberger et al. | |
| 2023/0009601 A1 | 1/2023 | Taranta et al. | |
| 2023/0018465 A1 | 1/2023 | Lyngsoe et al. | |
| 2023/0124226 A1 | 4/2023 | Hui et al. | |
| 2024/0101464 A1 | 3/2024 | Rosenberger et al. | |

FOREIGN PATENT DOCUMENTS

| | | | |
|---|---|---|---|
| CN | 108549128 | A | 9/2018 |
| CN | 108760718 | A | 11/2018 |
| CN | 108919418 | B | 11/2018 |
| CN | 109116467 | A | 1/2019 |
| CN | 109541741 | A | 3/2019 |
| CN | 109932778 | A | 6/2019 |
| CN | 110221381 | B | 9/2019 |
| CN | 110501777 | B | 11/2019 |
| CN | 209690556 | U | 11/2019 |
| CN | 110673256 | B | 1/2020 |
| CN | 111175884 | A | 5/2020 |
| CN | 111257992 | A | 6/2020 |
| CN | 111474627 | A | 7/2020 |
| CN | 111474628 | B | 7/2020 |
| CN | 111796364 | A | 10/2020 |
| CN | 111947805 | A | 11/2020 |
| CN | 111999800 | A | 11/2020 |
| CN | 112014920 | A | 12/2020 |
| CN | 112230329 | B | 1/2021 |
| CN | 112305663 | B | 2/2021 |
| CN | 112526669 | A | 3/2021 |
| CN | 112596280 | A | 4/2021 |
| CN | 112666649 | A | 4/2021 |
| CN | 112698439 | A | 4/2021 |
| CN | 112740086 | A | 4/2021 |
| CN | 112859236 | A | 5/2021 |
| CN | 113049138 | A | 6/2021 |
| CN | 113067572 | A | 7/2021 |
| CN | 113126203 | A | 7/2021 |
| CN | 113296186 | A | 8/2021 |
| CN | 113311533 | A | 8/2021 |
| CN | 113448010 | A | 9/2021 |
| CN | 113497404 | A | 10/2021 |
| CN | 113589456 | A | 11/2021 |
| CN | 113711095 | A | 11/2021 |
| CN | 113874332 | A | 12/2021 |
| CN | 113885120 | A | 1/2022 |
| CN | 113891864 | A | 1/2022 |
| CN | 113900172 | A | 1/2022 |
| CN | 113905991 | A | 1/2022 |
| CN | 113933928 | A | 1/2022 |
| CN | 113939482 | A | 1/2022 |
| CN | 113939483 | A | 1/2022 |
| CN | 113940613 | A | 1/2022 |
| CN | 215415988 | U | 1/2022 |
| CN | 114007990 | A | 2/2022 |
| CN | 114007991 | A | 2/2022 |
| CN | 114008499 | A | 2/2022 |
| CN | 114026048 | A | 2/2022 |
| CN | 114026049 | A | 2/2022 |
| CN | 114114526 | A | 3/2022 |
| CN | 114127022 | A | 3/2022 |
| CN | 114167542 | A | 3/2022 |
| CN | 114206792 | A | 3/2022 |
| CN | 114721086 | A | 7/2022 |
| CN | 114966954 | A | 8/2022 |
| CN | 115124232 | A | 9/2022 |
| CN | 115508943 | A | 12/2022 |
| CN | 115629444 | A | 1/2023 |
| CN | 218497187 | U | 2/2023 |
| CN | 115903126 | A | 4/2023 |
| CN | 116430511 | A | 7/2023 |
| CN | 116594097 | A | 8/2023 |
| CN | 116661054 | A | 8/2023 |
| CN | 116661055 | A | 8/2023 |
| CN | 117192681 | A | 12/2023 |
| CN | 117348147 | A | 1/2024 |
| CN | 117388980 | A | 1/2024 |
| CN | 117740065 | A | 3/2024 |
| DE | 102014011041 | A1 | 1/2016 |
| DK | 3152607 | T3 | 6/2019 |
| EP | 2082462 | B1 | 8/2014 |
| EP | 3199991 | A1 | 8/2017 |
| EP | 3249432 | A1 | 11/2017 |
| EP | 2321678 | B1 | 12/2018 |
| EP | 3152607 | B1 | 3/2019 |
| EP | 3047318 | B1 | 7/2020 |
| EP | 3249431 | B1 | 8/2020 |
| EP | 3719551 | A1 | 10/2020 |
| EP | 3047319 | B1 | 5/2021 |
| EP | 4001976 | A1 | 5/2022 |
| EP | 4020026 | A1 | 6/2022 |
| EP | 3834020 | B1 | 9/2022 |
| EP | 4067952 | A2 | 10/2022 |
| EP | 3662310 | B1 | 11/2022 |
| GB | 2518420 | B | 3/2015 |
| GB | 2562687 | B | 11/2018 |
| GB | 2562688 | B | 11/2018 |
| GB | 2562689 | B | 11/2018 |

(56) References Cited

FOREIGN PATENT DOCUMENTS

| | | | |
|---|---|---|---|
| GB | 2562971 | B | 11/2018 |
| GB | 2563758 | B | 12/2018 |
| GB | 2576190 | B | 2/2020 |
| HK | 40002087 | B | 3/2020 |
| HK | 40066163 | A | 8/2022 |
| JP | 2017520804 | A | 7/2017 |
| JP | 6636509 | B2 | 1/2020 |
| JP | 2020016891 | A | 1/2020 |
| JP | 2020525391 | A | 8/2020 |
| JP | 2020533264 | A | 11/2020 |
| JP | 6876762 | B2 | 5/2021 |
| JP | 6910486 | B2 | 7/2021 |
| JP | 2021534445 | A | 12/2021 |
| JP | 2022033896 | A | 3/2022 |
| JP | 2022530426 | A | 6/2022 |
| JP | 2022541097 | A | 9/2022 |
| JP | 7178471 | B2 | 11/2022 |
| JP | 7193530 | B2 | 12/2022 |
| TW | 202240264 | A | 10/2022 |
| WO | 2015040187 | A1 | 3/2015 |
| WO | 2015040189 | A2 | 3/2015 |
| WO | 2015185761 | A1 | 12/2015 |
| WO | 2017072750 | A1 | 5/2017 |
| WO | 2019008352 | A1 | 1/2019 |
| WO | 2019025797 | A1 | 2/2019 |
| WO | 2019053412 | A1 | 3/2019 |
| WO | 2020030888 | A1 | 2/2020 |
| WO | 2020030894 | A1 | 2/2020 |
| WO | 2020070488 | A1 | 4/2020 |
| WO | 2020210208 | A1 | 10/2020 |
| WO | 2020217052 | A1 | 10/2020 |
| WO | 2021018593 | A1 | 2/2021 |
| WO | 2021023969 | A1 | 2/2021 |
| WO | 2021089360 | A1 | 5/2021 |
| WO | 2022028812 | A1 | 2/2022 |
| WO | 2022053783 | A1 | 3/2022 |
| WO | 2022122350 | A1 | 6/2022 |
| WO | 2022128272 | A1 | 6/2022 |
| WO | 2022156956 | A1 | 7/2022 |
| WO | 2022157010 | A1 | 7/2022 |
| WO | 2022157179 | A1 | 7/2022 |
| WO | 2022161703 | A1 | 8/2022 |
| WO | 2022175647 | A1 | 8/2022 |
| WO | 2022263788 | A1 | 12/2022 |
| WO | 2023014550 | A1 | 2/2023 |

OTHER PUBLICATIONS

Belari et al., "Negative curvature fibers with reduced leakage loss," Center for Photonics and Photonics Materials, 2014, 1 page.

Bradley et al., "Record Low-Loss 1.3dB/km Data Transmitting Antiresonant Hollow Core Fibre," 2018 European Conference on Optical Communication, Sep. 2018, 3 pages.

Cordeiro et al., "Azimuthally asymmetric tubular lattice hollow-core optical fiber," Journal of the Optical Society of America, Optical Physics, vol. 38, No. 12, Dec. 2021, 6 pages.

Couny et al., "Reduction of Fresnel Back-Reflection at Splice Interface Between Hollow Core PCF and Single-Mode Fiber," IEEE Photonics Technology Letters, vol. 19, No. 13, Jul. 1, 2007, 3 pages.

Ding et al., "Recent Progress in Low-Loss Hollow-Core Anti-Resonant Fibers and Their Applications," IEEE Journal of Selected Topics in Quantum Electronics, vol. 26, No. 4, Jul./Aug. 2020, 12 pages.

Fokoua et al., "Loss in hollow-core optical fibers: mechanisms, scaling rules, and limits," Advances in Optics and Photonics, vol. 15, No. 1, Mar. 2023, 85 pages.

Gao et al., "Hollow-core conjoined-tube negative-curvature fibre with ultralow loss," Nature Communications, Jul. 19, 2018, 6 pages.

Gerome et al., "Tapered hollow-core photonic crystal fibers," The European Optical Society Annual Meeting, HAL open science, Sep. 14, 2022, 3 pages.

Habib et al., "Single-mode, low loss hollow-core anti-resonant fiber designs," Optics Express, vol. 27, No. 4, Feb. 18, 2019, 13 pages.

Hartung et al., "Double antiresonant hollow core fiber—guidance in the deep ultraviolet by modified tunneling leaky modes," Optical Society of America, vol. 22, No. 16, Jul. 30, 2014, 10 pages.

Hong et al., "Highly Birefringent Anti-Resonant Hollow-Core Fiber with a Bi-Thickness Fourfold Semi-Tube Structure," Laser & Photonics Reviews, Research Article, Feb. 2022, 9 pages.

Jaison et al., "Hollow Core NANF with 0.28 dB/km Attenuation in the C and L Bands," Optical Fiber Communication Conference, Jan. 2020, 3 pages.

Komanec et al., "Low-Loss and Low-Back-Reflection Hollow-Core to Standard Fiber Interconnection," IEEE Photonics Technology Letters, vol. 31, No. 10, May 15, 2019, 4 pages.

Masruri et al., "Confinement loss scaling law analysis in tube lattice fibers for terahertz applications," Proceedings of SPIE, Mar. 7, 2014, 7 pages.

Ordu et al., "Re-thinking the design of low-loss hollow-core fibers via optimal positioning of the nested elements," Optics Letters, vol. 47, No. 12, Jun. 15, 2022, 4 pages.

Osorio et al., "Hollow-core fibers with reduced surface roughness and ultralow loss in the short-wavelength range," nature communications, Feb. 28, 2023, 10 pages.

Osorio et al., "Hollow-core fibers with specific modal operation and low loss in the short-wavelength range," HAL open science, Jul. 2020, 5 pages.

Osorio et al., "Sub-thermodynamic equilibrium surface roughness in hollowcore fibers for the ultraviolet range," HAL open science, Sep. 2021, 3 pages.

Poletti, "Nested antiresonant nodeless hollow core fiber," Optical Society of America, vol. 22, No. 20, Sep. 22, 2014, 22 pages.

Pryamikov et al., "Hollow-core optical fibers: current state and development prospects," Russian Academy of Sciences, Mar. 2024, 29 pages.

Sakr et al., "Hollow Core NANFs with Five Nested Tubes and Record Low Loss at 850, 1060, 1300 and 1625nm," Optical Fiber Communication Conference, Jun. 2021, 3 pages.

Shaha et al., "Low-loss single-mode modified conjoined tube hollow-core fiber," Applied Optics, vol. 60, No. 21, Jul. 20, 2021, 8 pages.

Suslov et al., "Low loss and broadband low back-reflection interconnection between a hollow-core and standard single-mode fiber," Optics Express, vol. 30, No. 20, Sep. 26, 2022, 9 pages.

Suslov et al., "Low loss and high performance interconnection between standard single-mode fiber and antiresonant hollow-core fiber," Scientific Reports, Nature Portfolio, Apr. 22, 2021, 9 pages.

Vincetti et al., "Waveguiding mechanism in tube lattice fibers," Optical Society of America, Optics Express, vol. 18, No. 22, Oct. 19, 2010, 14 pages.

Wang et al., "Birefringent and low loss semi-tube hollow-core fiber," Optica Publishing Group, Jan. 2023, 3 pages.

Zhang et al., "Angle-Spliced SMF to Hollow Core Fiber Connection with Optimized Back-Reflection and Insertion Loss," Journal of Lightwave Technology, vol. 40, No. 19, Oct. 1, 2022, 6 pages.

Zhong et al., "Gap design to enable functionalities into nested antiresonant nodeless fiber based systems," Optics Express, vol. 31, No. 9, Apr. 24, 2023, 10 pages.

* cited by examiner

ANTI-RESONANT HOLLOW-CORE FIBERS FEATURING SEGMENTED INTERIOR CAVITIES AND NESTED ANTI-RESONANT STRUCTURES

The present application claims the benefit under 35 U.S.C. § 119(e) of U.S. Provisional Application Ser. No. 63/470,560, filed Jun. 2, 2023, entitled ANTI-RESONANT HOLLOW-CORE FIBERS FEATURING SEGMENTED INTERIOR CAVITIES AND NESTED ANTI-RESONANT STRUCTURES, naming Rodrigo Amezcua-Correa, Jose Enrique Antonio-Lopez, Stephanos Yerolatsitis, and Daniel Cruz Delgado as inventors, which is incorporated herein by reference in the entirety.

TECHNICAL FIELD

The present disclosure relates generally to optical fiber designs and, more particularly, to designs of anti-resonant hollow core fibers.

BACKGROUND

Anti-resonant (AR) hollow core fibers have the potential to replace solid-core standard silica fibers in a wide range of applications, including many telecommunication applications. Many of these applications require fibers that have attenuation losses comparable to state-of-the-art silica single-mode fibers and operate in a broadband range (i.e. low losses for a wide range of wavelengths). There is therefore a need to develop systems and methods for designing and manufacturing AR hollow core fibers.

SUMMARY

In embodiments, the techniques described herein relate to an optical fiber including a cladding structure extending along a fiber length providing a hollow interior fiber region; and a plurality of anti-resonant (AR) elements distributed within the hollow interior fiber region, each of the plurality of AR elements formed as walled structures with walls extending along the fiber length, where at least some of the plurality of AR elements are nested to form one or more nested sets of AR elements, where at least one of the nested sets of AR elements includes a first AR element of the plurality of AR elements, where an interior region of the first AR element is segmented into two or more interior cavities by one or more segmentation walls extending along the fiber length, where at least one of the two or more interior cavities of the first AR element includes two or more second AR elements of the plurality of AR elements, where the plurality of AR elements is configured to guide light along the fiber length at least partially within the hollow interior fiber region based on optical antiresonance.

In embodiments, the techniques described herein relate to an optical fiber, where the two or more interior cavities have non-circular cross-sectional shapes.

In embodiments, the techniques described herein relate to an optical fiber, where a ratio of a cross-sectional area of each of the two or more interior cavities relative to a cross-sectional area of the interior region of the first AR element is greater than or equal to a selected threshold.

In embodiments, the techniques described herein relate to an optical fiber, where the selected threshold expressed as a percentage is 10%.

In embodiments, the techniques described herein relate to an optical fiber, where a relative circumferential distance associated with a ratio between a separation distance of endpoints of any of the one or more segmentation walls along a circumference of the first AR element to the circumference of the first AR element is greater than or equal to a selected threshold.

In embodiments, the techniques described herein relate to an optical fiber, where the selected threshold expressed as a percentage is 10%.

In embodiments, the techniques described herein relate to an optical fiber, where at least one of the one or more segmentation walls is another AR element that contributes to the guiding of the light along the fiber length at least partially within the hollow interior fiber region based on optical antiresonance.

In embodiments, the techniques described herein relate to an optical fiber, where at least one of the plurality of AR elements includes one or more support structures formed as at least a portion of at least one of the walls of at least one of the plurality of AR elements, where the one or more support structures have non-uniform thickness profiles.

In embodiments, the techniques described herein relate to an optical fiber, where the interior region of the first AR element is segmented into three or more interior cavities by two or more segmentation walls extending along the fiber length.

In embodiments, the techniques described herein relate to an optical fiber, further including one or more third AR elements nested within an interior cavity at least one of the two or more second AR elements.

In embodiments, the techniques described herein relate to an optical fiber, further including one or more third AR elements nested within an interior cavity of at least one of the two or more second AR elements.

In embodiments, the techniques described herein relate to an optical fiber, further including one or more additional structures connected to the cladding structure.

In embodiments, the techniques described herein relate to an optical fiber, where at least one of the one or more nested sets of AR elements is connected to at least one of the one or more additional structures.

In embodiments, the techniques described herein relate to an optical fiber, where the cladding structure is formed from two or more layers of material.

In embodiments, the techniques described herein relate to an optical fiber, further including one or more perimeter structures between the cladding structure and at least one of the plurality of AR elements.

In embodiments, the techniques described herein relate to an optical fiber, where the one or more nested sets of AR elements include two or more nested sets of AR elements uniformly distributed around a perimeter of the hollow interior fiber region.

In embodiments, the techniques described herein relate to an optical fiber, where the one or more nested sets of AR elements include two or more nested sets of AR elements non-uniformly distributed around a perimeter of the hollow interior fiber region.

In embodiments, the techniques described herein relate to an optical fiber, where the one or more nested sets of AR elements include two or more nested sets of AR elements with a common design.

In embodiments, the techniques described herein relate to an optical fiber, where at least one of the one or more nested sets of AR elements includes a first set of AR elements having a first design; and a second set of AR elements having a second design.

In embodiments, the techniques described herein relate to an optical fiber, where the cladding structure is formed from two or more layers of material.

In embodiments, the techniques described herein relate to an optical fiber, where the cladding structure is formed from two or more layers of material, where the cladding structure further includes one or more additional structures between at least two of the two or more layers of the material.

In embodiments, the techniques described herein relate to an optical fiber, where the hollow interior fiber region is filled with a gas.

In embodiments, the techniques described herein relate to an optical fiber, where the hollow interior fiber region is under vacuum.

In embodiments, the techniques described herein relate to an optical fiber including a cladding structure extending along a fiber length providing a hollow interior fiber region; and a plurality of anti-resonant (AR) elements distributed within the hollow interior fiber region, each of the plurality of AR elements formed as walled structures with walls extending along the fiber length, where at least some of the plurality of AR elements are nested to form one or more nested sets of AR elements, where at least one of the nested sets of AR elements includes a first AR element of the plurality of AR elements, where an interior region of the first AR element is segmented into two or more interior cavities by one or more segmentation walls extending along the fiber length, where each one of the two or more interior cavities of the first AR element includes one or more second AR elements of the plurality of AR elements, where the plurality of AR elements is configured to guide light along the fiber length at least partially within the hollow interior fiber region based on optical antiresonance.

In embodiments, the techniques described herein relate to an optical fiber, where the two or more interior cavities have non-circular cross-sectional shapes.

In embodiments, the techniques described herein relate to an optical fiber, where a ratio of a cross-sectional area of each of the two or more interior cavities relative to a cross-sectional area of the interior region of the first AR element is greater than or equal to a selected threshold.

In embodiments, the techniques described herein relate to an optical fiber, where the selected threshold expressed as a percentage is 10%.

In embodiments, the techniques described herein relate to an optical fiber, where a relative circumferential distance associated with a ratio between a separation distance of endpoints of any of the one or more segmentation walls along a circumference of the first AR element to the circumference of the first AR element is greater than or equal to a selected threshold.

In embodiments, the techniques described herein relate to an optical fiber, where the selected threshold expressed as a percentage is 10%.

In embodiments, the techniques described herein relate to an optical fiber, where at least one of the one or more segmentation walls is another AR element that contributes to the guiding of the light along the fiber length at least partially within the hollow interior fiber region based on optical antiresonance.

In embodiments, the techniques described herein relate to an optical fiber, where at least one of the plurality of AR elements includes one or more support structures formed as at least a portion of at least one of the walls of at least one of the plurality of AR elements, where the one or more support structures have non-uniform thickness profiles.

In embodiments, the techniques described herein relate to an optical fiber, where the interior region of the first AR element is segmented into three or more interior cavities by two or more segmentation walls extending along the fiber length.

In embodiments, the techniques described herein relate to an optical fiber, further including one or more third AR elements nested within an interior cavity at least one of the one or more second AR elements.

In embodiments, the techniques described herein relate to an optical fiber, further including one or more third AR elements nested within an interior cavity of at least one of the one or more second AR elements.

In embodiments, the techniques described herein relate to an optical fiber, further including one or more additional structures connected to the cladding structure.

In embodiments, the techniques described herein relate to an optical fiber, where at least one of the one or more nested sets of AR elements is connected to at least one of the one or more additional structures.

In embodiments, the techniques described herein relate to an optical fiber, where the cladding structure is formed from two or more layers of material.

In embodiments, the techniques described herein relate to an optical fiber, further including one or more perimeter structures between the cladding structure and at least one of the plurality of AR elements.

In embodiments, the techniques described herein relate to an optical fiber, where the one or more nested sets of AR elements include two or more nested sets of AR elements uniformly distributed around a perimeter of the hollow interior fiber region.

In embodiments, the techniques described herein relate to an optical fiber, where the one or more nested sets of AR elements include two or more nested sets of AR elements non-uniformly distributed around a perimeter of the hollow interior fiber region.

In embodiments, the techniques described herein relate to an optical fiber, where the one or more nested sets of AR elements include two or more nested sets of AR elements with a common design.

In embodiments, the techniques described herein relate to an optical fiber, where at least one of the one or more nested sets of AR elements includes a first set of AR elements having a first design; and a second set of AR elements having a second design.

In embodiments, the techniques described herein relate to an optical fiber, where the cladding structure is formed from two or more layers of material.

In embodiments, the techniques described herein relate to an optical fiber, where the cladding structure is formed from two or more layers of material, where the cladding structure further includes one or more additional structures between at least two of the two or more layers of the material.

In embodiments, the techniques described herein relate to an optical fiber, where the hollow interior fiber region is filled with a gas.

In embodiments, the techniques described herein relate to an optical fiber, where the hollow interior fiber region is under vacuum.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
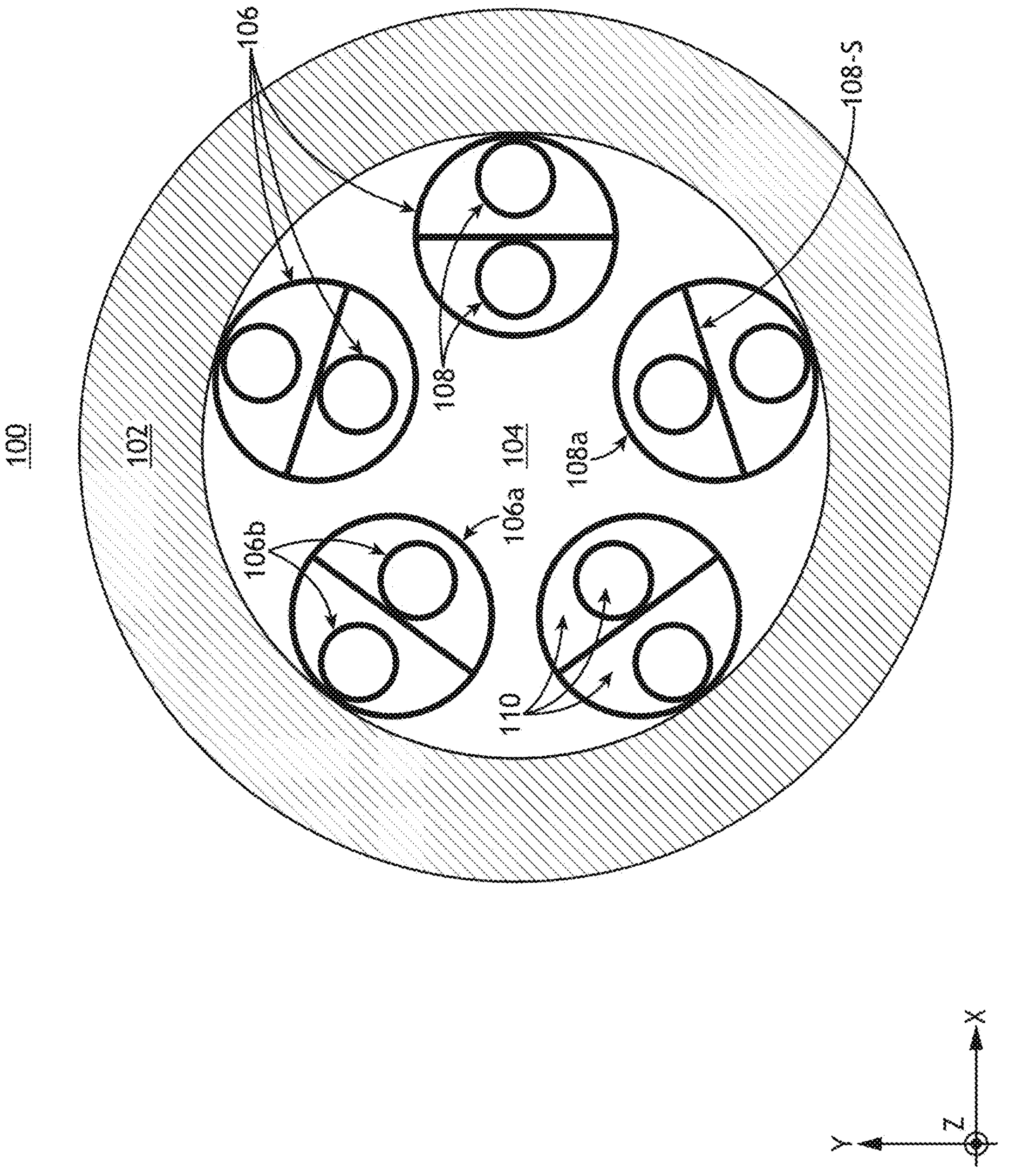
FIG. 1A is a simplified cross-section of an AR-HCF, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing anti-resonant hollow-core fibers (AR-HCFs) with nested sets of anti-resonant (AR) elements, where at least one of the AR elements is segmented (e.g., with additional walls, segmentation walls, or the like) into multiple interior regions, and where additional AR elements are within any of the interior regions. In some embodiments, at least one of the nested sets of AR elements is segmented to provide two or more interior cavities, where each of the interior cavities includes one or more additional AR elements. In some embodiments, at least one of the nested sets of AR elements is segmented to provide two or more interior cavities, where at least one of the interior cavities includes two or more (e.g., multiple) additional AR elements.

An AR-HCF may include one or more cladding structures providing a hollow interior fiber region extending a length of the fiber (e.g., along a fiber length) and multiple AR elements distributed around the interior fiber region, which forms a hollow core surrounded by AR elements. Further, such an AR-HCF may have any suitable size. In some embodiments, the hollow core size of an AR-HCF fiber is between 5× and 100× the guided wavelength. For example, the hollow core size of an AR-HCF fiber may be, but is not limited to, 5×, 10×, 20×, 30×, 50×, or 100× the guided wavelength.

Any of the AR elements may include walled structures with walls that extend along the fiber length. For example, the walls of the AR elements and/or the distribution of the AR elements more generally may provide guiding of light in a central hollow interior region of the AR-HCF through anti-resonant optical phenomena. It is contemplated herein that various aspects of the performance of an AR-HCF such as, but not limited to, the confinement of light within the interior fiber region may be impacted by the placement and arrangement of the various AR elements.

In some embodiments, at least one of the AR elements is segmented to provide two or more interior cavities. For example, the two or more interior cavities may be distinct from a hollow interior fiber region in which light is substantially guided. In this way, the two or more interior cavities may each be separately pressurized during and/or after fabrication. In general, an AR element may include any number or design of interior walls to form any number or design of interior cavities. Further, the interior cavities may be the same size (e.g., when viewed in cross-section) or different sizes. Additional AR elements may then be nested within any of these interior cavities and attached to any of the walls bounding an interior cavity.

It is contemplated herein that segmenting an interior region of an AR element enables substantial flexibility in the number, size, and placement of AR elements within an AR-HCF. Additionally, walls providing the segmentation of an AR element may further be AR elements themselves and may thus contribute to anti-resonant guiding of light in an AR-HCF.

Referring now to FIGS. 1A-8, systems and methods providing AR-HCFs including nested AR elements with segmented interior cavities are described in greater detail, in accordance with one or more embodiments of the present disclosure.

FIG. 1A is a simplified cross-section of an AR-HCF 100, in accordance with one or more embodiments of the present disclosure. In particular, FIG. 1A depicts a cross-section of the AR-HCF 100 in an X-Y plane, where a length of the AR-HCF 100 extends along the Z direction (e.g., a direction along the fiber length). It is to be understood that an AR-HCF 100 may generally be flexible and/or bend such that the fiber length need not extend along a straight line. In this way, the cross-sectional view depicted in FIG. 1A may correspond to a plane orthogonal to the fiber length at any selected location.

In some embodiments, an AR-HCF 100 includes one or more cladding structures 102 providing a hollow interior guiding region 104 in which light is substantially guided. For example, FIG. 1A depicts an AR-HCF 100 with a single cladding structure 102 formed as a circular tube. Additional non-limiting variations of the cladding structures 102 are described below with respect to FIGS. 4A-4C.

In some embodiments, an AR-HCF 100 includes multiple AR elements 106 distributed in the hollow interior guiding region 104 provided by the cladding structures 102. An AR-HCF 100 may generally have any number of AR elements 106 and the AR elements 106 may be evenly or unevenly distributed around a perimeter of the hollow interior guiding region 104. An AR element 106 may include any features providing anti-resonant properties suitable for guiding light within the hollow interior guiding region 104 based on optical anti-resonance. For example, an AR element 106 may include one or more walls 108 having a thickness and refractive index suitable for providing anti-resonant properties for at least some wavelengths of interest.

In some embodiments, an AR element 106 provides a bounded interior cavity 110. Such an interior cavity 110 may be separately pressurized during and/or after fabrication. In some embodiments, an AR element 106 is nested within another AR element 106 (e.g., nested within an interior cavity 110 at least partially bounded by another AR element 106). Such nested AR elements 106 may be referred to as a set of AR elements 106, a nested set of AR elements 106, or simply as nested AR elements 106. Further, any of the AR elements 106 may be spatially isolated from other AR elements 106, may be in contact with other AR elements 106, or may be nested within other AR elements 106.

For example, FIGS. 1A-1F depict cross-sectional views of six non-limiting configurations of an AR-HCF 100 with five nested sets of AR elements 106 uniformly distributed around a perimeter of the hollow interior guiding region 104 formed by the cladding structure 102, in accordance with one or more embodiments of the present disclosure.

In some embodiments, a set of nested AR elements 106 includes a first AR element 106*a* (e.g., an outer AR element 106) including walls 108 arranged to form at least one interior cavity 110 and further includes one or more second AR elements 106*b* (e.g., inner AR elements 106) within any of the interior cavities 110 of the first AR element 106*a*.

Figure 1B:
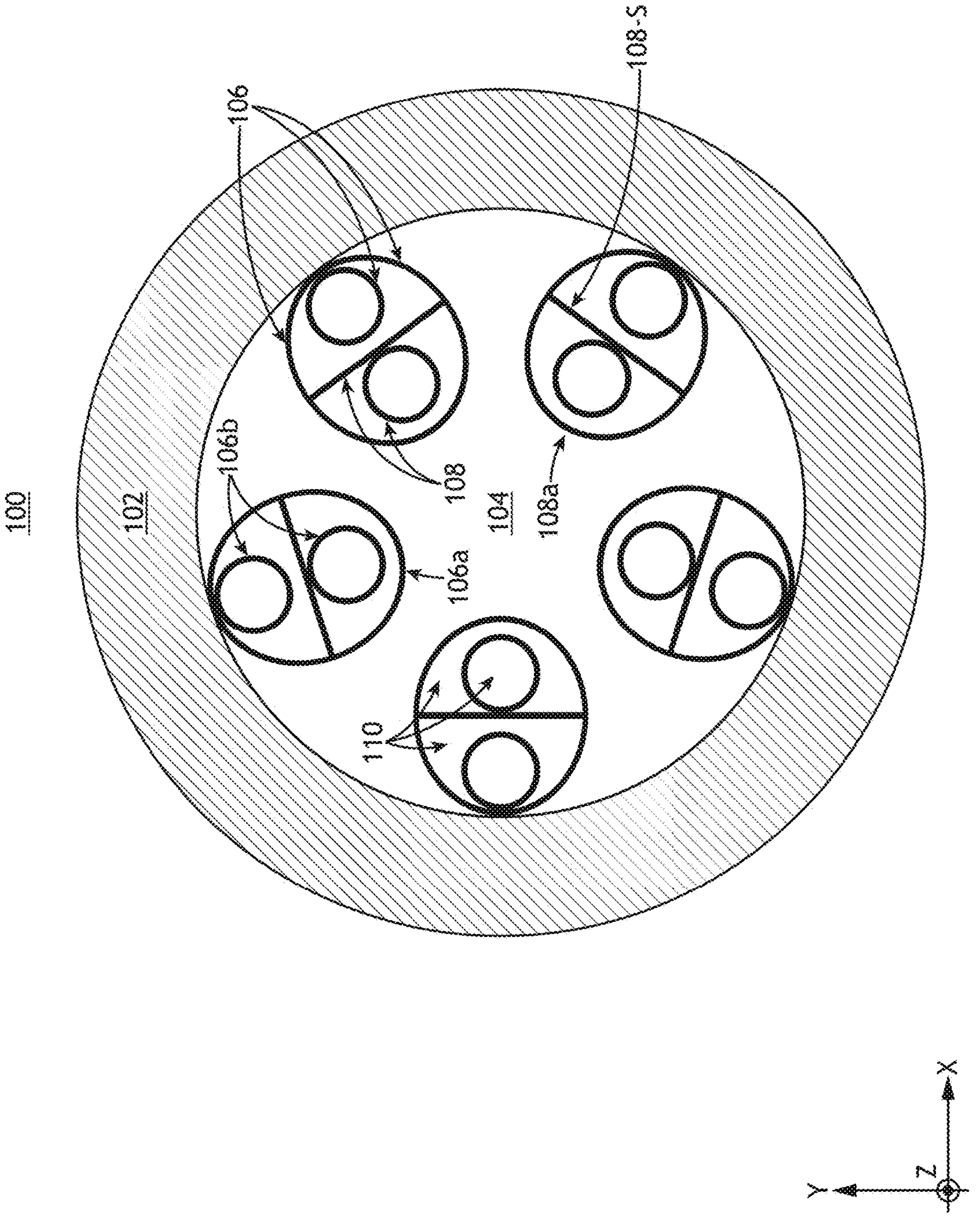
FIG. 1B is a cross-sectional view of an AR-HCF with elliptical AR elements, in accordance with one or more embodiments of the present disclosure.

AR elements 106 may generally have any cross-sectional shape. In some embodiments, an AR element 106 has a closed cross-sectional shape with any combination of straight or curved sides (e.g., straight or curved walls 108) that form a bounded interior cavity 110. A closed cross-sectional shape may include, but is not limited to, a polygon with any number of sides (e.g., a triangle, a square, a pentagon, a hexagon, a heptagon, an octagon, or the like) or a closed cross-sectional shape with one or more curved sides (e.g., a circle, an ellipse, or the like). As an illustration, the AR elements 106 in FIGS. 1A-1B are depicted with closed cross-sectional shapes (e.g., circles and/or ellipses).

In some embodiments, an AR element 106 has an open cross-sectional shape with any combination of straight or curved sides (e.g., straight or curved walls 108). In this configuration, a bounded interior cavity 110 may be formed when endpoints of the walls 108 contact additional elements such as, but not limited to, a cladding structure 102 or another AR element 106. For example, an open cross-sectional shape may include, but is not limited to, a truncated polygon or a truncated shape having one or more curved sides. As an illustration, FIGS. 1C-1E and inset 704 of FIG. 7 depict several designs of AR elements 106 with open cross-sectional shapes.

Various designs of AR elements and AR-HCFs are generally described in U.S. patent application Ser. No. 18/662,573 titled ANTI-RESONANT HOLLOW-CORE FIBERS FEATURING SUPPORT STRUCTURES and filed on May 13, 2024, which is incorporated herein by reference in its entirety. An AR element 106 may have any shape or design depicted in U.S. patent application Ser. No. 18/662,573.

In some embodiments, a set of nested AR elements 106 includes one or more segmentation walls 108-S that segment a bounded interior region of one of the AR elements 106 into two or more interior cavities 110. For example, FIGS. 1A-1B depict configurations in which segmentation walls 108-S divide an interior region of first AR elements 106*a* into two interior cavities 110, where various second AR elements 106*b* are located within one or both of the two interior cavities 110.

Figure 1C:
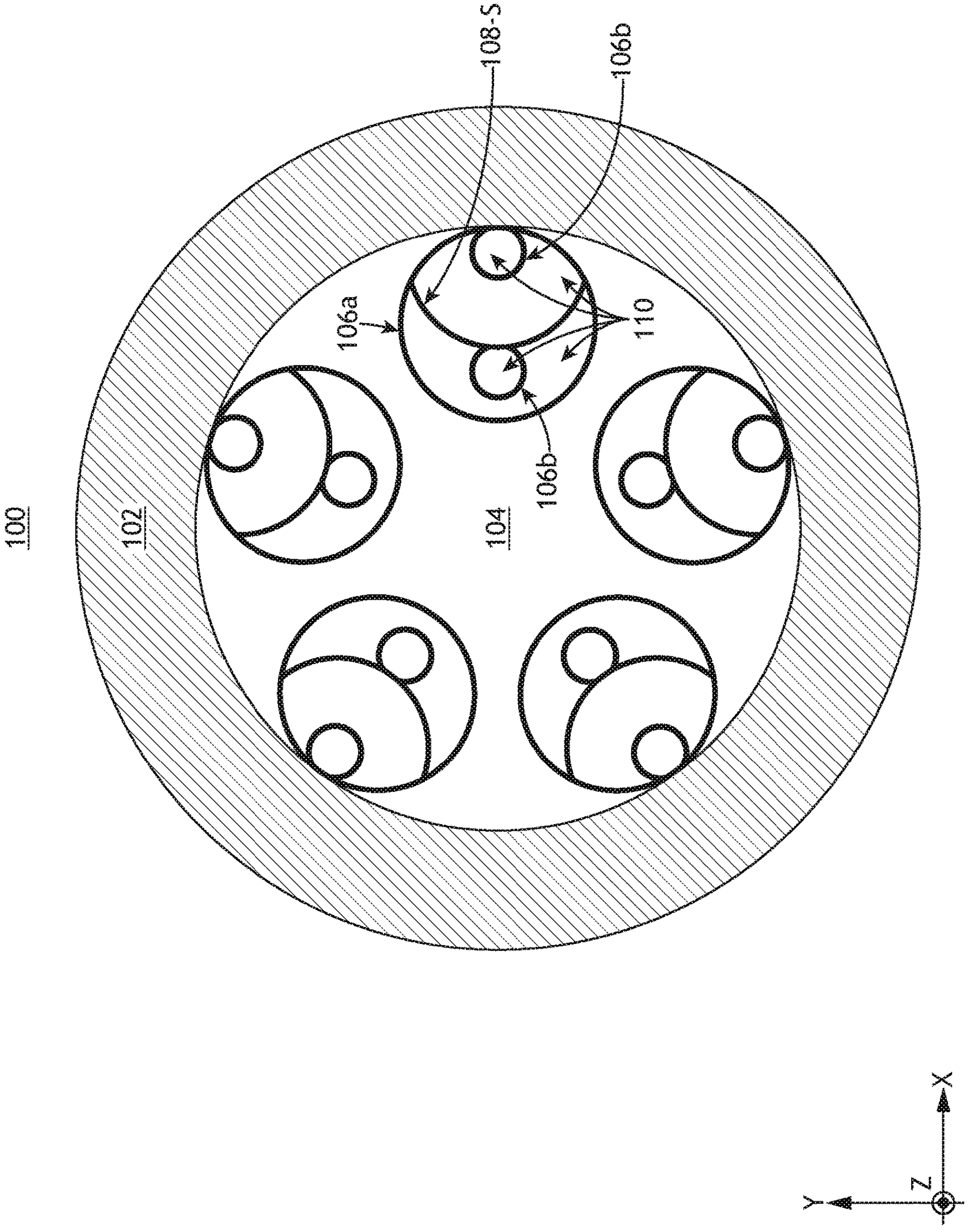
FIG. 1C is a cross-sectional view of one design of an AR-HCF, in accordance with one or more embodiments of the present disclosure.
Figure 1D:
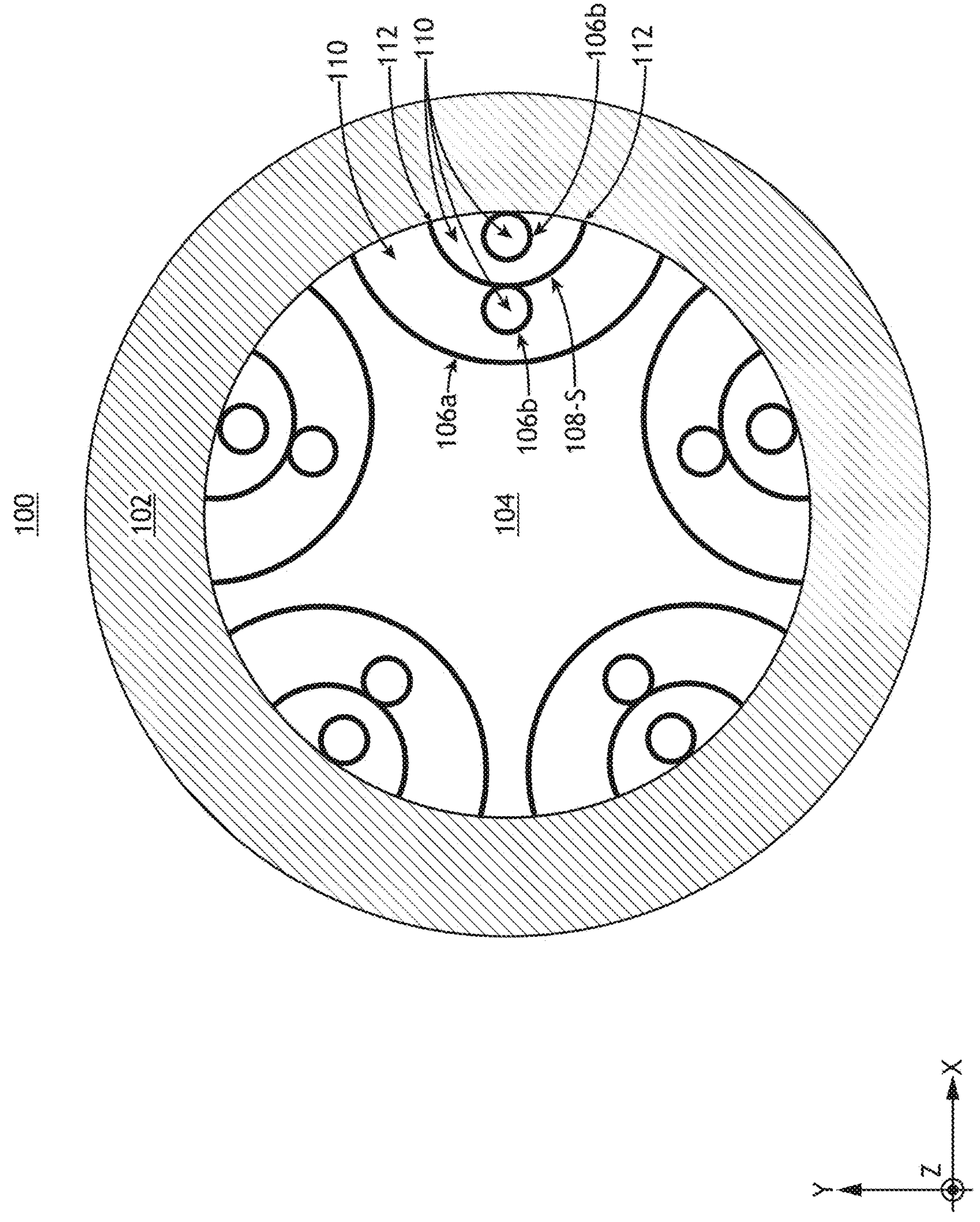
FIG. 1D is a cross-sectional view of one design of an AR-HCF, in accordance with one or more embodiments of the present disclosure.

A segmentation wall 108-S may be straight or curved. For example, FIGS. 1A, 1B, 1E, and 1F depict straight segmentation walls 108-S, while FIGS. 1C-1D depict curved segmentation walls 108-S. A segmentation wall 108-S may connect to other walls 108 of an AR element 106 at any locations to provide interior cavities 110 of any sizes or shapes. Further, any number of segmentation walls 108-S may divide an interior region of an AR element 106 into any number of interior cavities 110. In this way, the depictions of a single segmentation wall 108-S within each first AR element 106*a* in FIGS. 1A-1F is merely illustrative and not limiting on the scope of the present disclosure.

A segmentation wall 108-S and/or the associated interior cavities 110 formed by a segmentation wall 108-S may be characterized in multiple ways within the spirit and scope of the present disclosure.

For example, a segmentation wall 108-S and/or the associated interior cavities 110 may be described by a shape of the interior cavities 110. In some embodiments, a segmentation wall 108-S divides an interior region of an AR element into interior cavities 110 with non-circular and/or non-elliptical cross-sectional shapes.

For example, a segmentation wall 108-S and/or the associated interior cavities 110 may be described by the cross-sectional areas of the interior cavities. For instance, FIGS. 1A-1F depict configurations in which each segmentation wall 108-S divides an interior region of first AR element 106*a* into two interior cavities 110 with equal cross-sectional area. Put another way, a ratio of a cross-sectional area of each of the interior cavities 110 relative to a cross-sectional area of all interior cavities 110 within the first AR element 106*a* combined is 50%. However, this is merely an illustration. A segmentation wall 108-S may divide an interior region of an AR element 106 to provide an interior cavity 110 with any relative cross-sectional area. In some embodiments, a segmentation wall 108-S provides interior cavities that each have relative cross-sectional areas greater than or equal to a selected threshold (e.g., greater than or equal to 10%, 15%, 20%, 25%, 30%, 35%, 40%, 45%, 50%, or the like when expressed as a percentage). It is contemplated herein that providing relatively large interior cavities 110 (e.g., interior cavities 110 with relatively large relative cross-sectional areas) may provide sufficient space for additional nested AR elements 106 within the interior cavities 110.

As another example, a segmentation wall 108-S and/or the associated interior cavities 110 may be described by a shortest separation distance between endpoints of the segmentation wall 108-S relative to a circumference of an associated AR element 106. As used herein, the term relative circumferential distance refers to a ratio between a separation of endpoints of a segmentation wall 108-S as measured along a circumference of an AR element 106 whose interior region is divided into separate interior cavities by the segmentation wall 108-S to a total circumference of this AR element 106. For instance, FIGS. 1A-1B depict configurations in which endpoints of each segmentation wall 108-S are separated by 50% of the circumference of the first AR element 106*a*. However, this is merely an illustration. Endpoints of a segmentation wall 108-S may provide any relative circumferential distance. In some embodiments, endpoints of a segmentation wall 108-S are separated by a relative circumferential distance greater than or equal to a selected threshold (e.g., greater than or equal to 10%, 15%, 20%, 25%, 30%, 35%, 40%, 45%, 50%, or the like when expressed as a percentage).

Various designs of nested AR elements 106 with one or more segmentation walls 108-S are now described in greater detail, in accordance with one or more embodiments of the present disclosure.

In some embodiments, a set of nested AR elements 106 includes one or more second AR elements 106*b* within each of the two or more interior cavities 110 of a first AR element 106*a*. For example, each of the nested sets of AR elements 106 in FIG. 1A includes a first AR element 106*a* having circular outer walls 108*a* and a segmentation wall 108-S segmenting an interior region of the first AR element 106*a* into two interior cavities 110 and a single second AR element 106*b* within each of the interior cavities 110.

However, it is noted that FIG. 1A is merely illustrative and that a first AR element 106*a* may have any number of second AR elements 106*b* within any number of interior cavities 110 generated by any number of segmentation walls 108-S with any design.

FIG. 1B is a cross-sectional view of an AR-HCF 100 with elliptical AR elements 106, in accordance with one or more embodiments of the present disclosure. In particular, FIG. 1B is substantially similar to FIG. 1A, except that the first AR elements 106*a* are elliptical rather than circular.

FIGS. 1C-1F illustrate additional non-limiting designs of AR-HCFs 100 in which nested sets of AR elements 106 including segmentation walls 108-S splitting an interior region of first AR elements 106*a* into two interior cavities 110 and in which each interior cavity 110 includes at least one second AR element 106*b*. FIGS. 1C-1F further illustrate different designs of segmentation walls 108-S as well as different cross-sectional shapes of AR elements 106.

FIG. 1C is a cross-sectional view of one design of an AR-HCF 100, in accordance with one or more embodiments of the present disclosure. In particular, FIG. 1C depicts a configuration in which first AR elements 106*a* have a closed circular cross-sectional shape as depicted in FIG. 1A, but where the segmentation walls 108-S in each set of nested AR elements 106 is curved. Further, one of the second AR elements 106*b* of each nested set of AR elements 106 is connected to a convex portion of the curved segmentation wall 108-S. However, this is not a requirement. In some embodiments, though not explicitly shown, one or more AR elements 106 may be connected to a concave portion of a curved segmentation wall 108-S.

FIG. 1D is a cross-sectional view of one design of an AR-HCF 100, in accordance with one or more embodiments of the present disclosure. In particular, FIG. 1D depicts a configuration in which each set of nested AR elements 106 includes a first AR elements 106*a* have open cross-sectional shapes with endpoints 112 connected to the cladding structure 102 to form a bounded interior region that is divided into two interior cavities 110 by a curved segmentation wall 108-S.

Figure 1E:
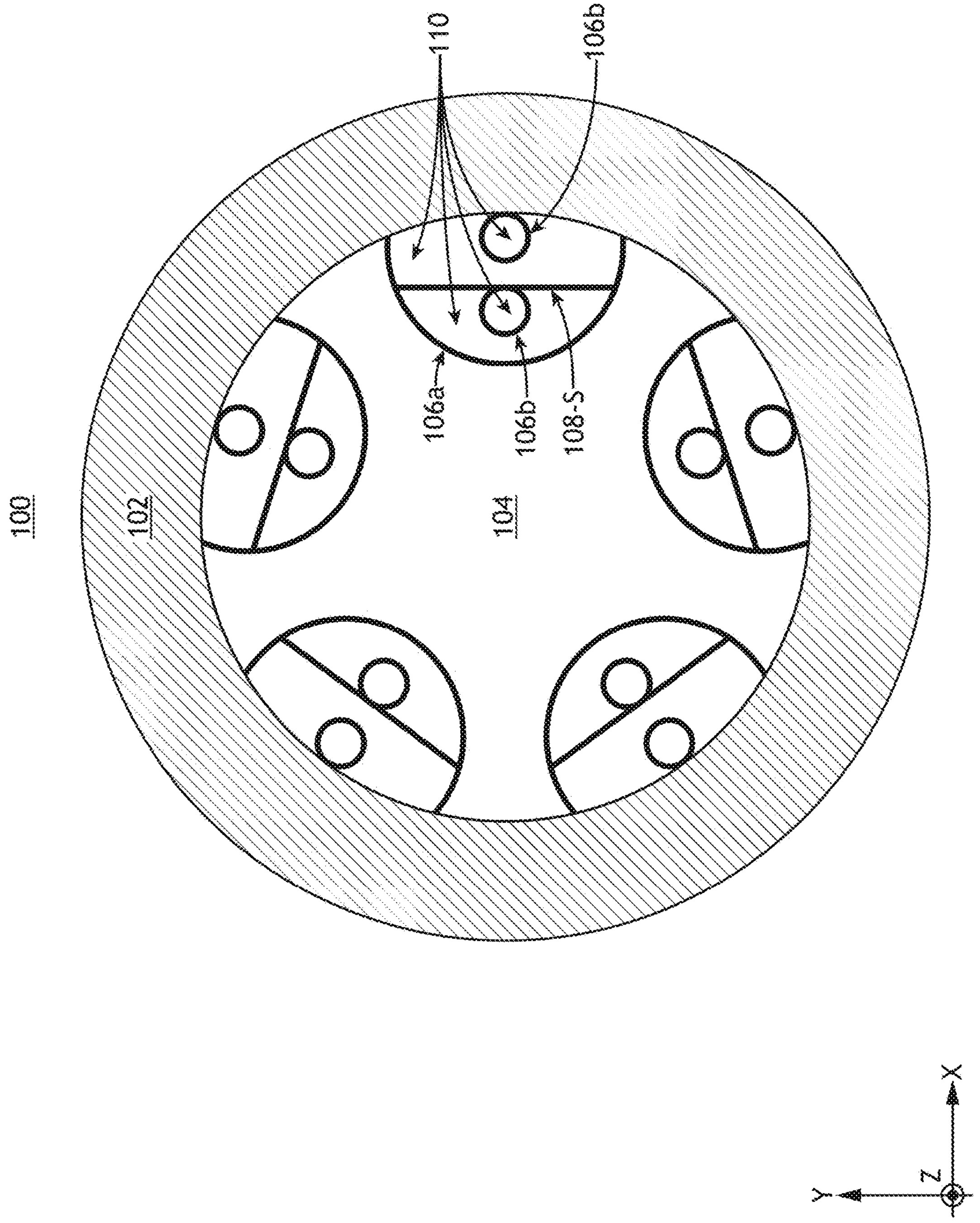
FIG. 1E is a cross-sectional view of one design of an AR-HCF, in accordance with one or more embodiments of the present disclosure.

FIG. 1E is a cross-sectional view of one design of an AR-HCF 100, in accordance with one or more embodiments of the present disclosure. In particular, FIG. 1E depicts a configuration in which each set of nested AR elements 106 includes a first AR elements 106*a* have open cross-sectional shapes with endpoints 112 connected to the cladding structure 102 to form a bounded interior region that is divided into two interior cavities 110 by a straight segmentation wall 108-S.

Figure 1F:
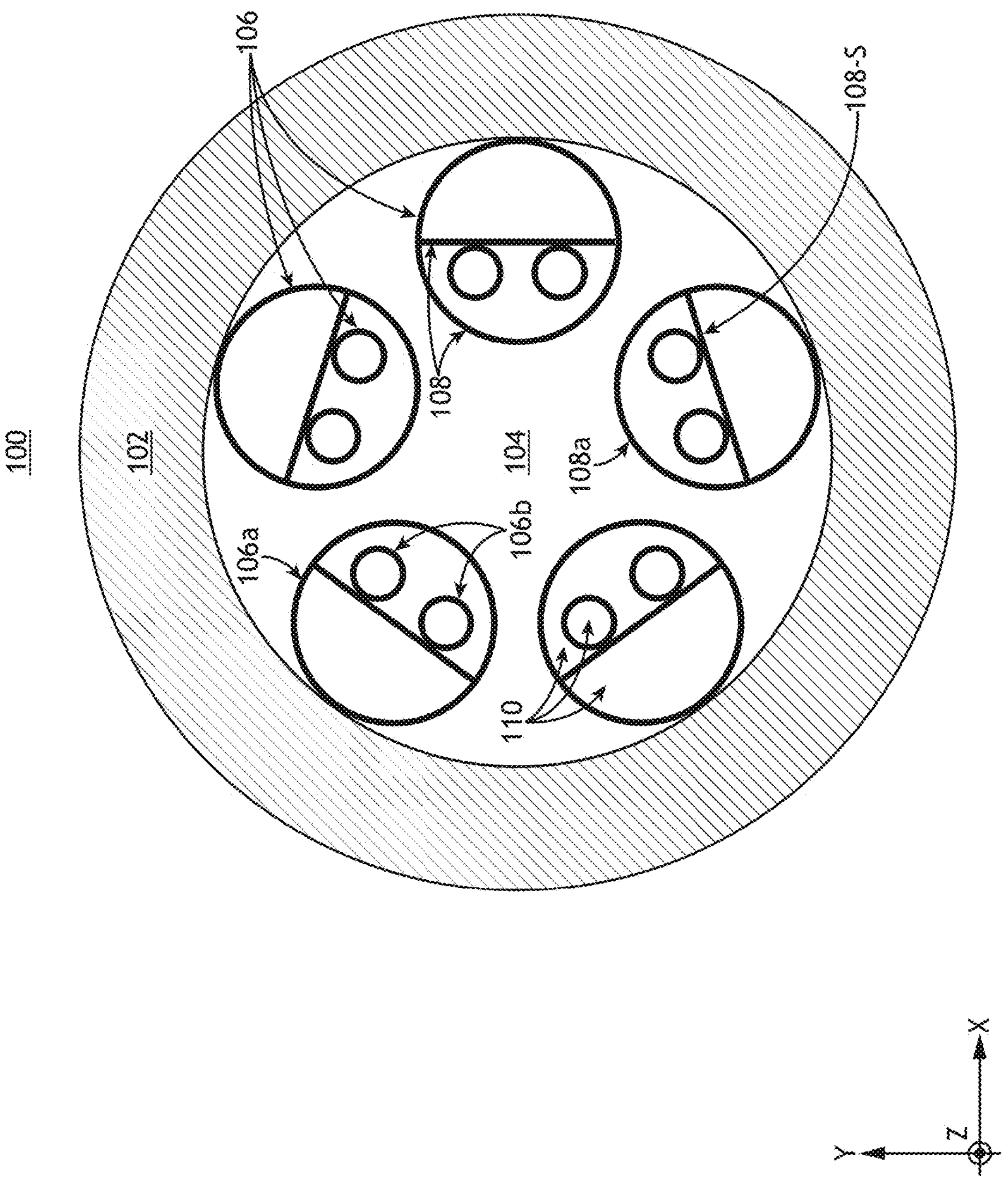
FIG. 1F is a cross-sectional view of one design of an AR-HCF, in accordance with one or more embodiments of the present disclosure.

In some embodiments, a set of nested AR elements 106 includes two or more second AR elements 106*b* within at least one of the interior cavities 110 of a first AR element 106*b*. FIG. 1F is a cross-sectional view of one design of an AR-HCF 100, in accordance with one or more embodiments of the present disclosure. In FIG. 1F, each of the nested sets of AR elements 106 includes a first AR element 106*a* having circular outer walls 108*a* and a segmentation wall 108-S segmenting an interior region of the first AR element 106*a* into two interior cavities 110 and two second AR elements 106*b* within one of the interior cavities 110. Further, the other interior cavity 110 in FIG. 1F is empty, but this is merely an illustration and not limiting on the scope of the present disclosure.

The various components of an AR-HCF 100 including, but not limited to, the AR elements 106 (e.g., the walls 108) or the cladding structures 102 may be formed from any suitable material such as, but not limited to, a glass or a polymer. For example, any such components may be formed from silica glass, doped silica glass, chalcogenide glass, fluoride glass, or the like. Further, any such components may be undoped or doped with one or more dopants. Additionally, an AR-HCF 100 may be formed from a single material or may have different components formed from different materials. For example, an outer wall 108*a* may be formed from a different material than a segmentation wall 108-S. As another example, nested AR elements 106 may be formed from different materials.

Additionally, any of the hollow regions of an AR-HCF 100 (e.g., the hollow interior fiber region 104, any of the interior cavities 110 of any of the AR elements 106, or the like) may be under vacuum or filled with any gas at any pressure (e.g., ambient air, nitrogen, argon, or any selected composition).

Referring generally to FIGS. 1A-1F, it is contemplated herein that the various walls 108 that make up any particular AR element 106 or set of nested AR elements 106 (e.g., outer walls 108*a* and/or segmentation walls 108-S) may have any combination of thicknesses and may potentially be formed from different materials.

Further, it is noted that although the various walls 108 depicted in FIGS. 1A-1F have a substantially uniform thickness, this is merely illustrative and not limiting. In some embodiments, at least some of the walls 108 have a non-uniform thickness. It is also contemplated herein that an AR-HCF 100 need not have a uniform distribution of AR elements 106 (or sets of AR elements 106) within the hollow interior guiding region 104. In some embodiments, an AR-HCF 100 includes AR elements 106 (or sets of AR elements 106) with different designs or configurations.

Figure 2A:
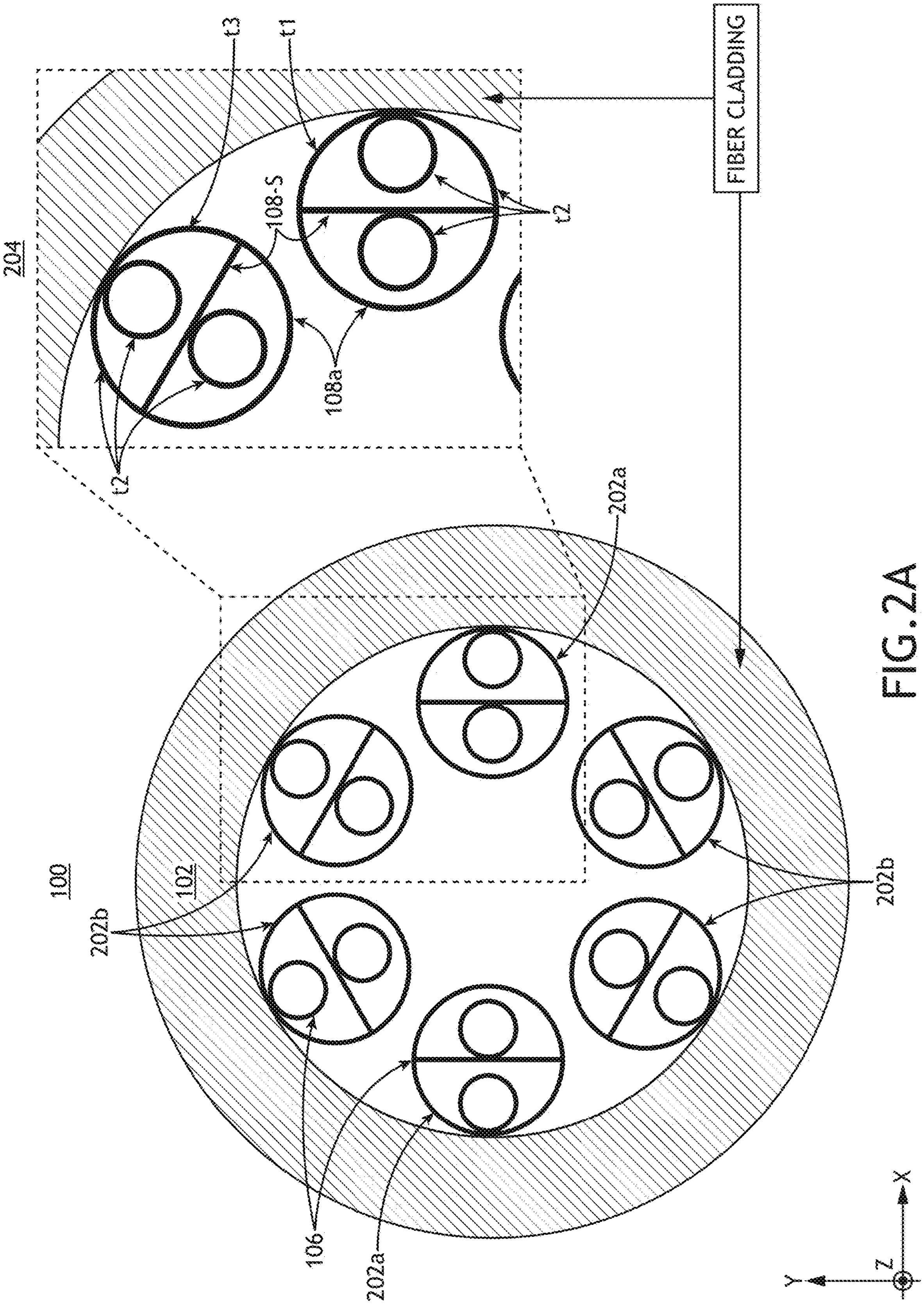
FIG. 2A is a cross-sectional view of an AR-HCF including multiple configurations of nested sets of AR elements, in accordance with one or more embodiments of the present disclosure.

FIG. 2A is a cross-sectional view of an AR-HCF 100 including multiple configurations of nested sets of AR elements 106, in accordance with one or more embodiments of the present disclosure. In FIG. 2A, each of the nested sets of AR elements 106 is similar to those depicted in FIG. 1A. However, the AR-HCF 100 in FIG. 2A includes two first nested sets of AR elements 106 with a first design 202*a* and four second nested sets of AR elements 106 with a second design 202*b*, both of which are shown in a magnified view in inset 204. The nested sets of AR elements 106 with the first design 202*a* include a first AR element 106*a* with an outer wall 108*a* having a first thickness ($t_1$) and a segmentation wall 108-S having a second thickness ($t_2$). The nested sets of AR elements 106 with the second design 202*b* include a first AR element 106*a* with an outer wall 108*a* having a third thickness ($t_3$) and a segmentation wall 108-S having the second thickness ($t_2$). In both cases shown here, the second AR elements 106*b* also have the second thickness ($t_2$), though this is merely illustrative and not a limitation.

Figure 2B:
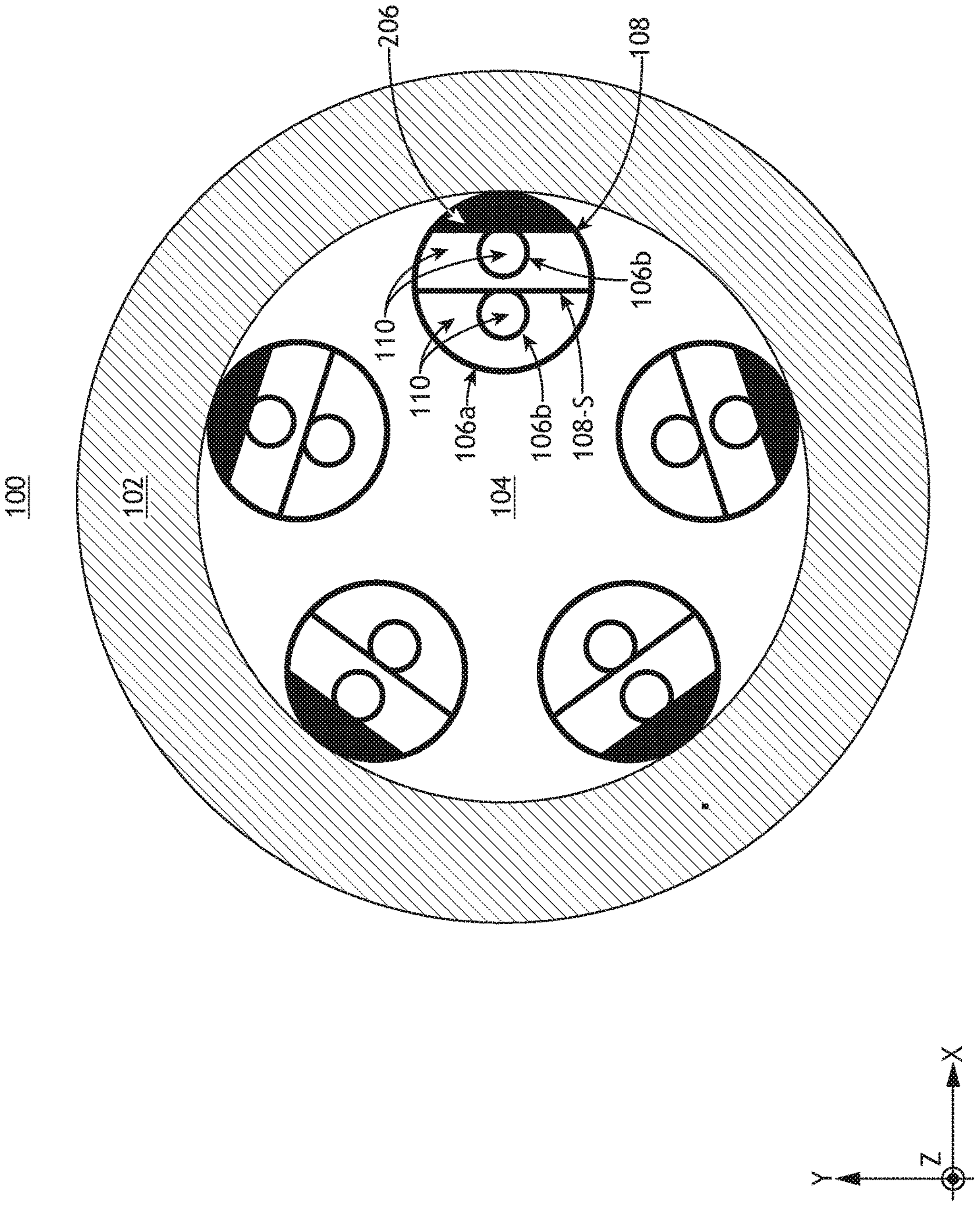
FIG. 2B is a cross-sectional view of one design of an AR-HCF including a support structure, in accordance with one or more embodiments of the present disclosure.

FIG. 2B is a cross-sectional view of one design of an AR-HCF 100 including a support structure, in accordance with one or more embodiments of the present disclosure. Support structures are generally described in U.S. patent application Ser. No. 18/662,572 filed May 13, 2024, which is incorporated herein by reference in its entirety. An AR-HCF 100 may include any combination of segmentation walls 108-S and support structures such as, but not limited to, support structures described in U.S. patent application Ser. No. 18/662,572.

In some embodiments, at least one of the AR elements 106*a* in an AR-HCF 100 is connected to one or more support structures, which may extend from the cladding structure and/or another of the AR elements 106. Such support structures may or may not provide AR properties directly. For example, a support structure may be relatively thick and may thus not operate as an antiresonant element itself. However, such a support structure may position one or more AR elements 106, or portions thereof, within the AR-HCF 100 to provide desired performance characteristics.

A support structure may generally have any shape suitable for positioning an AR element within an AR-HCF. Further, a support structure may be located at any location within an AR-HCF.

In some embodiments, a support structure extends from one AR element 106 to another. For example, a support structure may extend from or otherwise be a part of one or more AR elements 106. For instance, an AR element 106 may have walls 108 with a non-uniform thickness profile (e.g., as measured in a cross-sectional plane orthogonal to a direction along the fiber length). In this configuration, a support structure may be formed as a relatively thick portion of the walls 108 of an AR element 106. It is contemplated herein that such a configuration may be suitable for, but not limited to, positioning a nested AR element 106 within an interior region of another AR element 106.

Further, various classes of support structures are contemplated herein. These classes may distinguish support structures based on properties such as, but not limited to, location within an AR-HCF 100, connections to additional elements with an AR-HCF 100, structural properties, and/or optical properties (e.g., antiresonant properties, resonant properties, a number of nodes, or the like).

For example, numerical designations (e.g., Class 1, Class 2, or the like) may be used herein to identify a location of a support structure within an AR-HCF 100. Put another way, numerical designations may identify additional elements in an AR-HCF 100 that a support structure may contact or otherwise be integrated with. As an illustration, a Class 1 support structure may be located within an interior portion of an AR element 106. As another illustration, a Class 2 support structure may be located between an AR element 106 and an interior wall of a cladding structure 102.

Alphabetic designations (e.g., Class A, Class B, or the like) may be used herein to identify a degree of integration between a support structure (or a portion thereof) and another element in an AR-HCF 100 (e.g., an AR element 106, a cladding structure 102, or the like). As an illustration, a Class A integration may include an extended integration region (e.g., an extended touchpoint, an extended node, or the like) region with another element in an AR-HCF. As another illustration, a Class B integration may include multiple integration regions (e.g., multiple touchpoints, multiple nodes, or the like) with another element in an AR-HCF. For example, a support structure may have notches or "V" grooves providing multiple integration regions (e.g., multiple touchpoints) with another element (e.g., an AR element, a cladding structure, or the like). The use of multiple integration regions may provide various benefits including, but not limited to, providing robust alignment of elements within the AR-HCF 100, and providing high manufacturing tolerance and stability throughout the fiber-fabrication process as well as deployment. As another illustration, a Class C integration may include a single spatially-limited integration region (e.g., a single touchpoint, a single node, or the like).

Numerical and alphabetic designations may be combined into alphanumeric designations to describe support structures with particular properties. As an illustration, a Class 1A support structure may be located in an interior region of an AR element 106 and further be integrated to the AR element 106 along an extended integration region.

Further, a support structure may integrate with multiple additional elements with different degrees of integration. As an illustration, a Class 1 support structure within an interior region of a first AR element 106*a* (e.g., an outer AR element) may have a Class A integration with the first AR element 106*a* and a Class B integration with a second AR element 106*b* (e.g., an inner AR element).

It is contemplated herein that nomenclature used herein to separately describe AR elements 106 and support structures as separate elements is merely illustrative and should not be interpreted as limiting the scope of the present disclosure. For example, the various elements of a fabricated AR-HCF 100 (e.g., AR elements 106, cladding structures 102, support structures, and the like) may be fused together into a continuous fiber structure with a designed cross-sectional profile. In this way, the use of separate nomenclature herein to describe different aspects of the cross-sectional profile is merely for convenience of description. For example, some descriptions herein describe a support structure as extending from an AR element 106. However, such a support structure may be indistinguishable from the AR element 106 such that it may also be accurate to describe the support structure as being integrated into and forming a part of the AR element. For example, a support structure may be integrated with an AR element 106 in such a way that the AR element 106 and the support structure are one cohesive element.

Referring to FIG. 2B as an illustration, FIG. 2B depicts a configuration with Class 1 support structures 206 within the first AR elements 106*a* of each nested set of AR elements, where the support structures provide Class A integrations with the first AR elements 106*a* and Class C integrations with a second AR element 106*b*. For example, the first AR elements 106*a* may be characterized as having walls 108 having a non-uniform cross-sectional thickness profile to form the support structures 206. It is contemplated herein that such a configuration may be suitable for, but not limited to, positioning a second AR element 106*b* within an interior region of the first AR element 106*a*. Further, as depicted in FIG. 2B, the interior region of the first AR element 106*a* (here formed as an irregularly-shaped region due to the non-uniformly thick walls 108 forming the support structure 206) is divided into two interior cavities 110 by a segmentation wall 108-S. In this way, FIG. 2B is one non-limiting example of how segmentation walls 108-S and support structures (e.g., support structures 206) may be incorporated into a nested set of AR elements 106. More broadly, it is to be understood that a nested set of AR elements may include any combination of any number of segmentation walls 108-S in any constituent AR elements 106 and any number of support structures of any class in any number of the constituent AR elements 106.

Referring now to FIGS. 3A-3D, FIGS. 3A-3D are cross-sectional views of non-limiting configurations of an AR-HCF 100 including various designs of AR elements 106, in accordance with one or more embodiments of the present disclosure. Each of the configurations of an AR-HCF 100 shown in FIGS. 3A-3D include five nested sets of AR elements 106 of the same design (e.g., a common design), where a first AR element 106*a* includes two interior cavities 110 formed by a single segmentation wall 108-S. However, this is merely illustrative and not limiting. In a general sense, an AR-HCF 100 may include any combination of the AR elements 106 illustrated in FIGS. 3A-3D, but is not limited to the particular AR elements 106 illustrated in FIGS. 3A-3D. Further, any of the AR elements 106 in FIGS. 3A-3D may be nested within any additional AR element 106 of the same design (e.g., a common design) or different design.

Figure 3A:
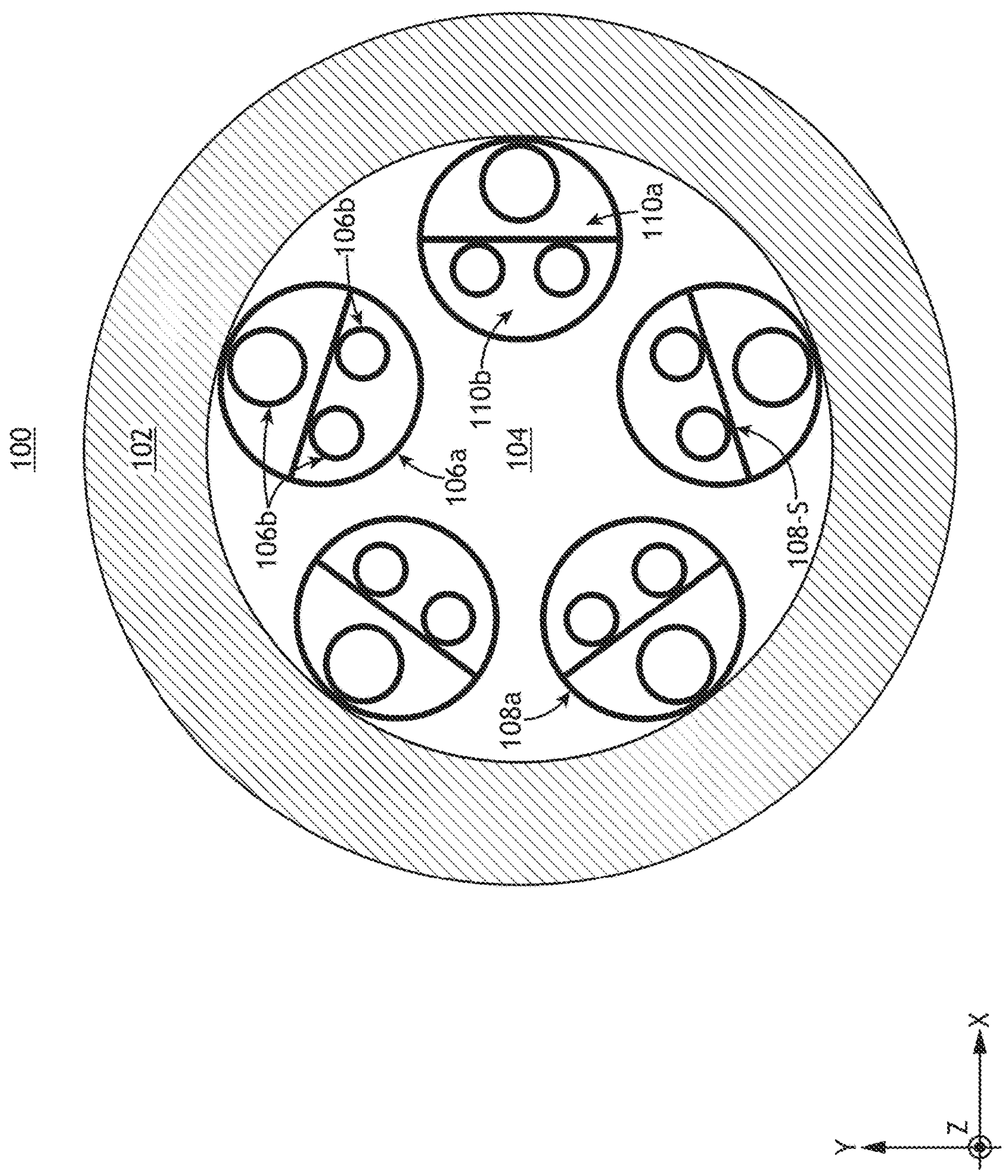
FIG. 3A is a cross-sectional view of one configuration of an AR-HCF, in accordance with one or more embodiments of the present disclosure.

FIG. 3A is a cross-sectional view of one configuration of an AR-HCF 100, in accordance with one or more embodiments of the present disclosure. In FIG. 3A, each nested set of AR elements 106 includes one second AR element 106*b* within a first interior cavity 110*a* of the first AR element 106*a* and two second AR elements 106*b* within a second interior cavity 110*b*.

Figure 3B:
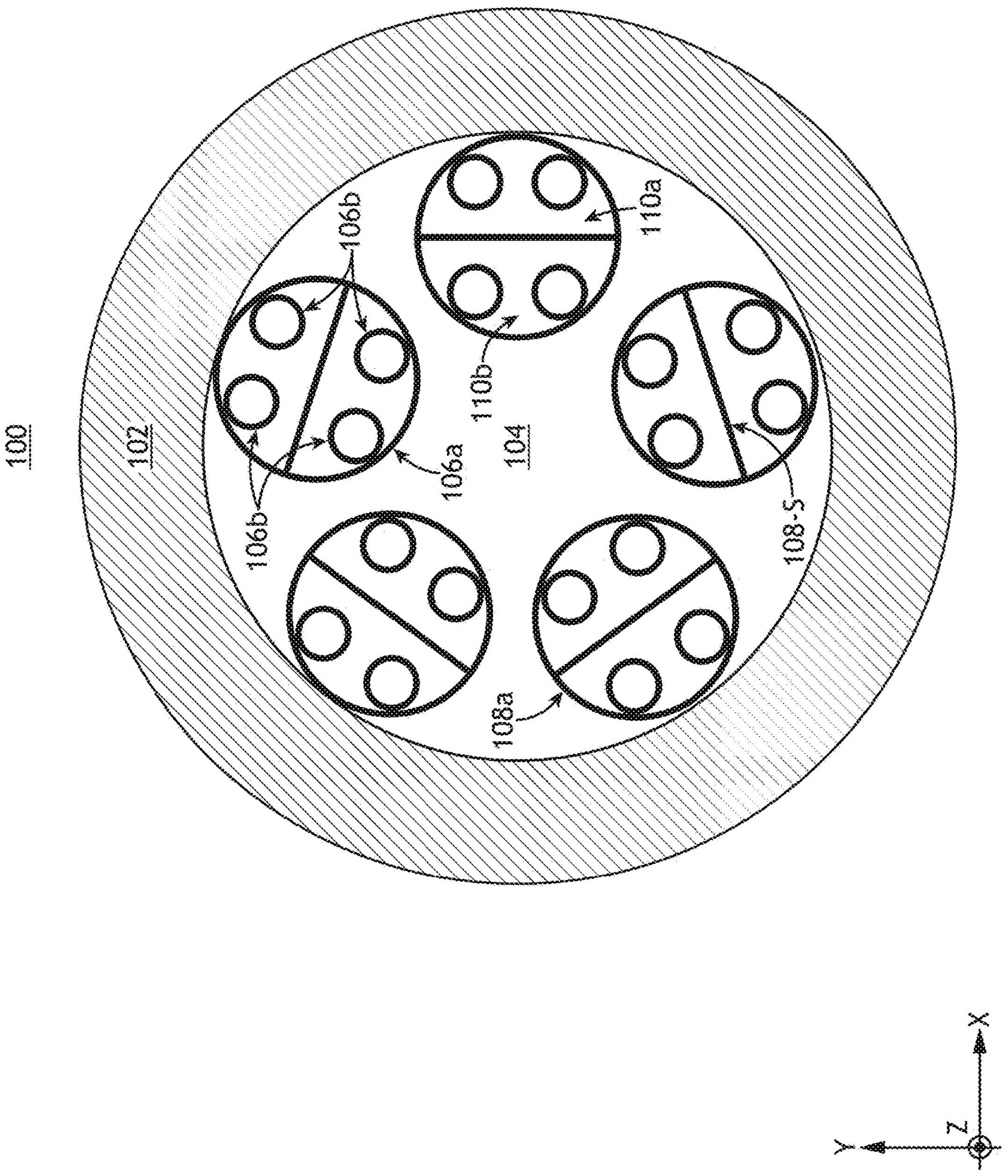
FIG. 3B is a cross-sectional view of one configuration of an AR-HCF, in accordance with one or more embodiments of the present disclosure.

FIG. 3B is a cross-sectional view of one configuration of an AR-HCF 100, in accordance with one or more embodiments of the present disclosure. In FIG. 3B, each nested set of AR elements 106 includes two second AR elements 106*b* within both a first interior cavity 110*a* and a second interior cavity 110*b* of the first AR element 106*a*.

Figure 3C:
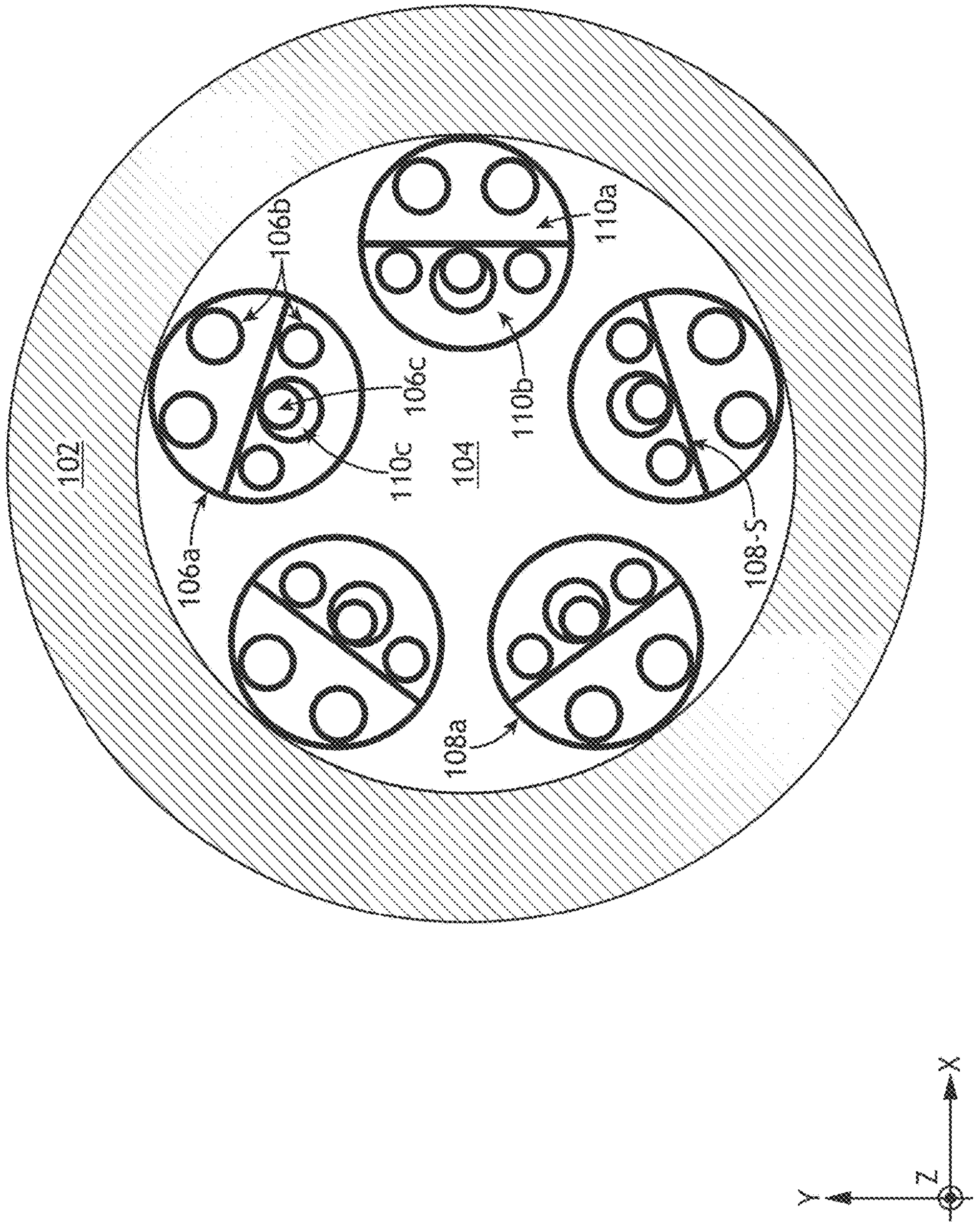
FIG. 3C is a cross-sectional view of one configuration of an AR-HCF, in accordance with one or more embodiments of the present disclosure.

FIG. 3C is a cross-sectional view of one configuration of an AR-HCF 100, in accordance with one or more embodiments of the present disclosure. In FIG. 3C, each nested set of AR elements 106 includes two second AR elements 106*b* within a first interior cavity 110*a* of the first AR element 106*a*, three second AR elements 106*b* within a second interior cavity 110*b*, and a third AR element 106*c* nested within an interior cavity 110*c* of one of the second AR elements 106*b*.

Figure 3D:
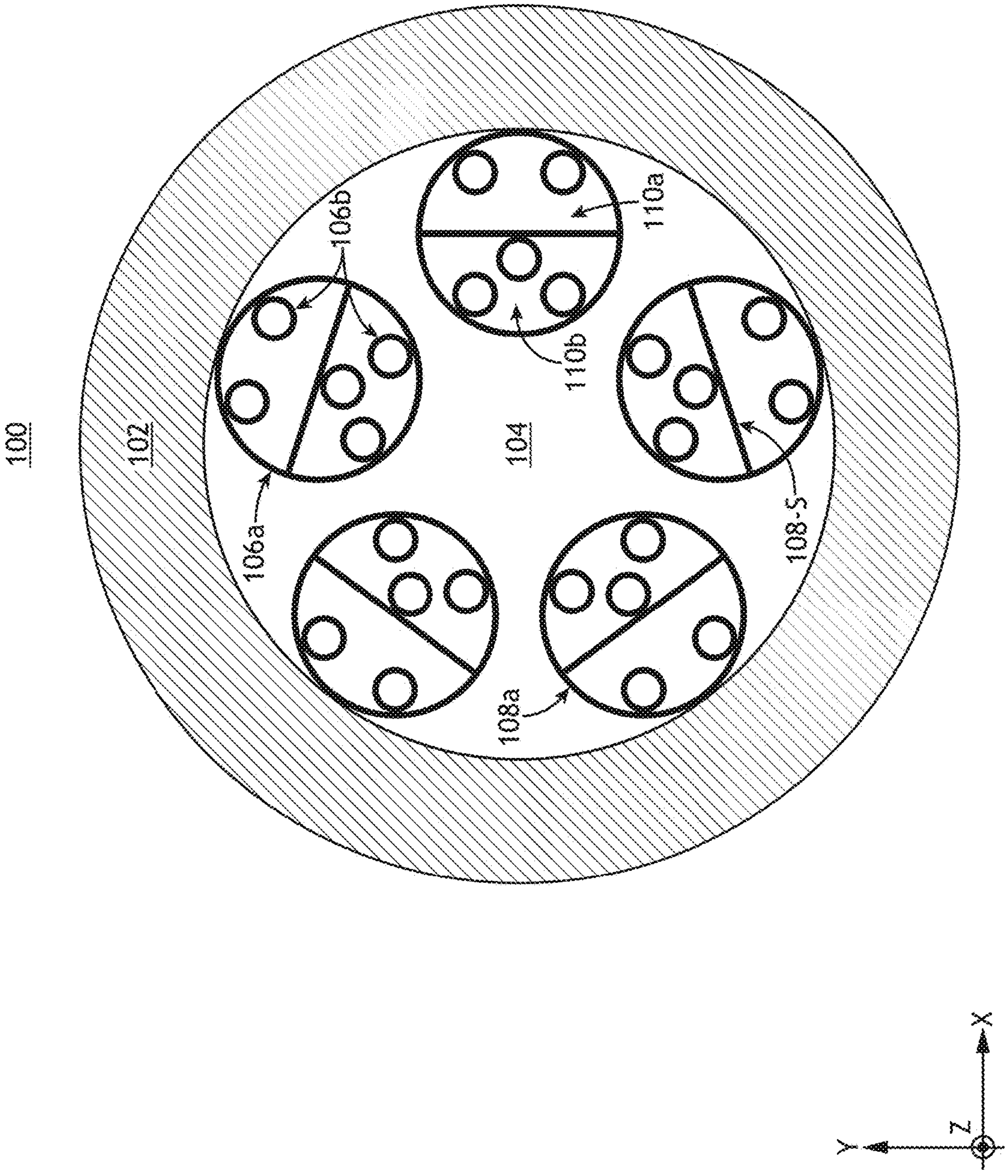
FIG. 3D is a cross-sectional view of one configuration of an AR-HCF, in accordance with one or more embodiments of the present disclosure.

FIG. 3D is a cross-sectional view of one configuration of an AR-HCF 100, in accordance with one or more embodiments of the present disclosure. In FIG. 3D, each nested set of AR elements 106 includes two second AR elements 106*b* within a first interior cavity 110*a* of the first AR element 106*a* and three second AR elements 106*b* within a second interior cavity 110*b*.

Further, FIGS. 3A-3D illustrate how nested AR elements 106 may be connected to any wall 108 of an interior cavity 110 including, but not limited to, an outer wall 108*a* or a segmentation wall 108-S. In some embodiments, though not shown, multiple second AR elements 106*b* may be stacked within an interior cavity 110 of a first AR element 106*a*.

Figure 4A:
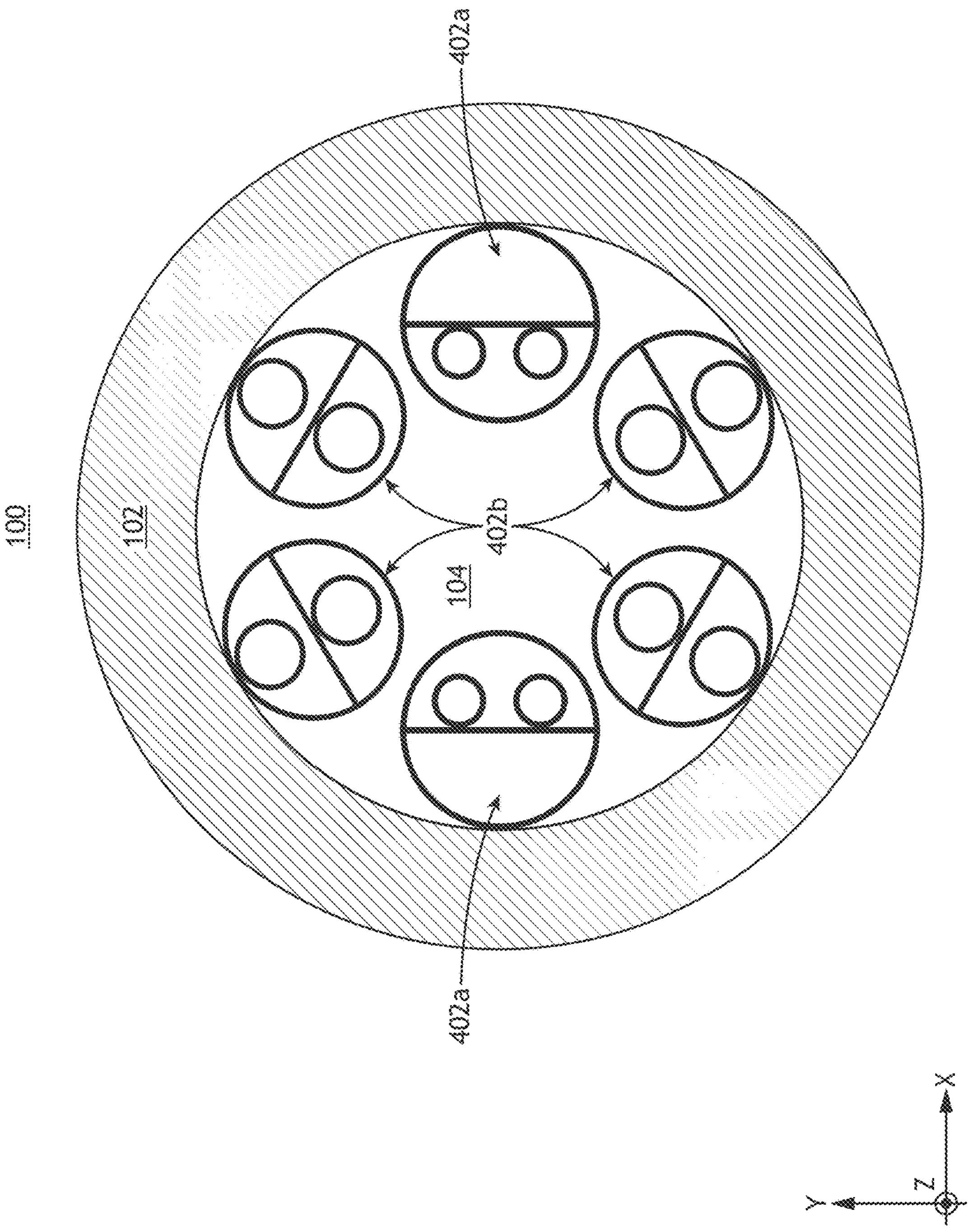
FIG. 4A is a cross-sectional view of one configuration of an AR-HCF, in accordance with one or more embodiments of the present disclosure.
Figure 4B:
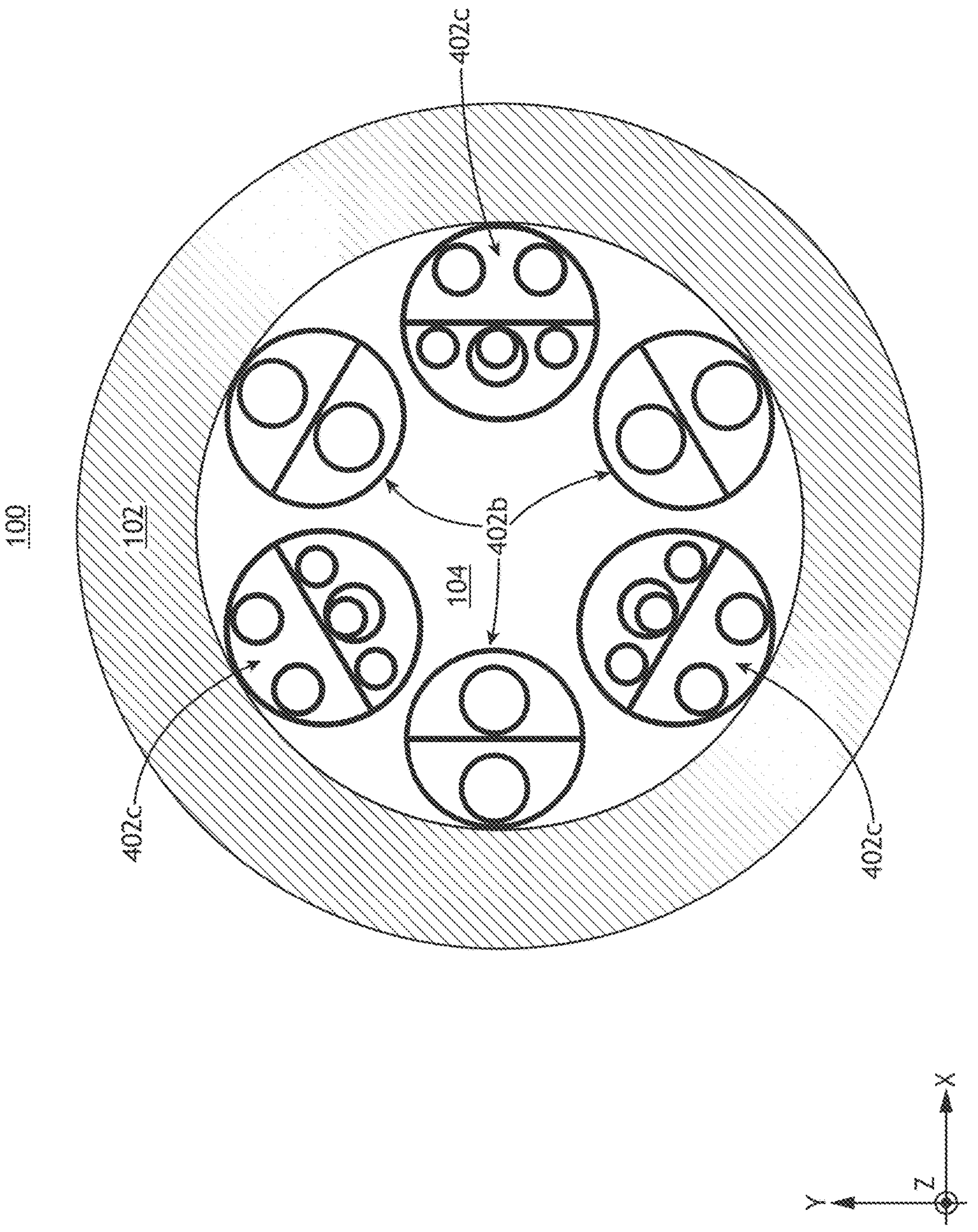
FIG. 4B is a cross-sectional view of one configuration of an AR-HCF, in accordance with one or more embodiments of the present disclosure.
Figure 4C:
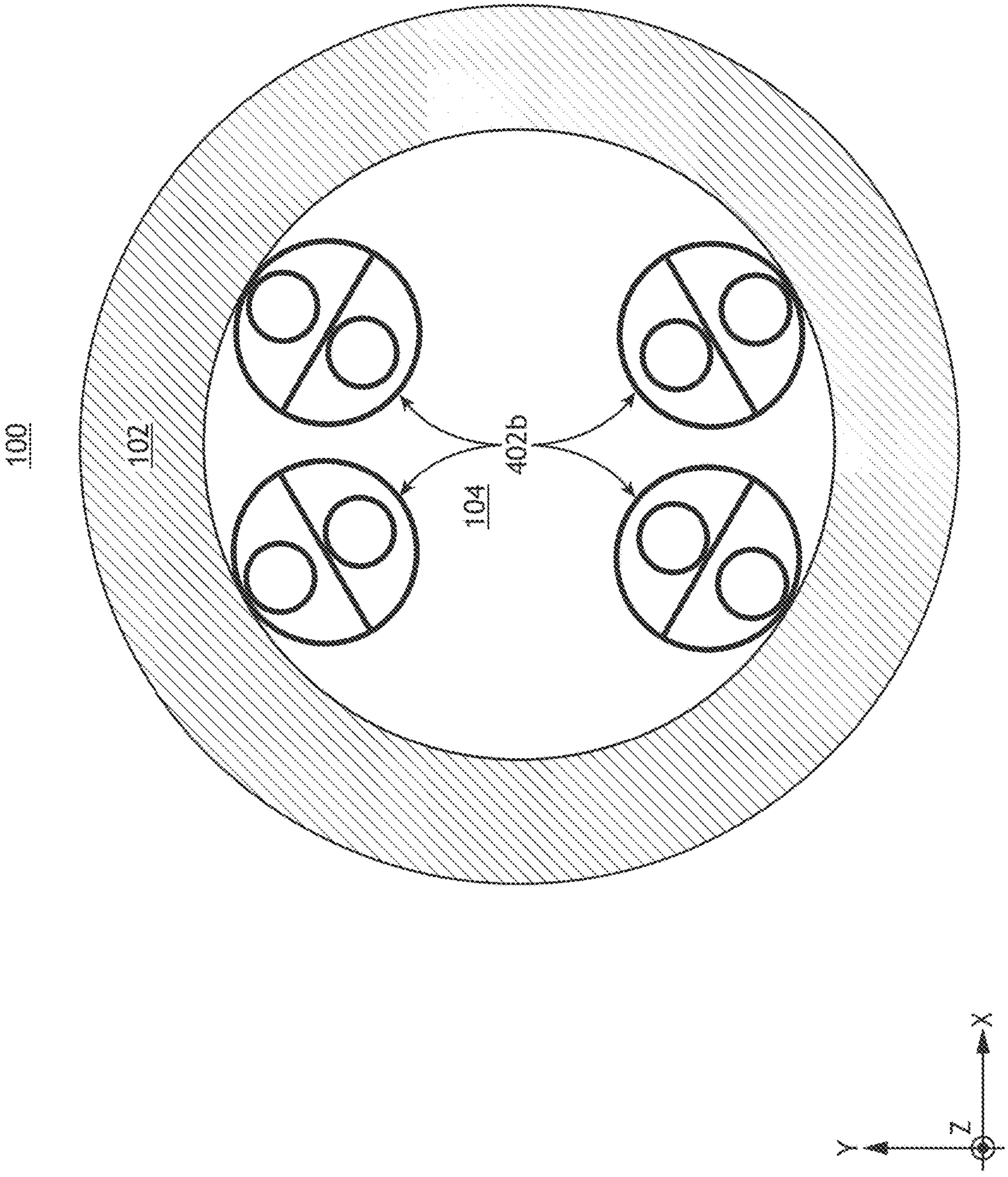
FIG. 4C is a cross-sectional view of one configuration of an AR-HCF, in accordance with one or more embodiments of the present disclosure.

Referring now to FIGS. 4A-4C, FIGS. 4A-4C include additional configurations of an AR-HCF 100 including nested sets of AR elements 106 with different designs.

FIG. 4A is a cross-sectional view of one configuration of an AR-HCF 100, in accordance with one or more embodiments of the present disclosure. The AR-HCF 100 in FIG. 4A includes two nested sets of AR elements 106 with a first design 402*a* and four nested sets of AR elements 106 with a second design 402*b*. In particular, the first design 402*a* is substantially similar to that shown in FIG. 1F, whereas the second design 402*b* is substantially similar to that shown in FIG. 1A.

FIG. 4B is a cross-sectional view of one configuration of an AR-HCF 100, in accordance with one or more embodiments of the present disclosure. The AR-HCF 100 in FIG. 4B includes three nested sets of AR elements 106 with a third design 402*c* and three nested sets of AR elements 106 with the second design 402*b* in an alternating pattern. The third design 402*c* is substantially similar to that shown in FIG. 3C.

FIG. 4C is a cross-sectional view of one configuration of an AR-HCF 100, in accordance with one or more embodiments of the present disclosure. The AR-HCF 100 in FIG. 4C includes four nested sets of AR elements 106 with the first design 402*b*, but arranged in a non-uniform distribution around a perimeter of the hollow interior guiding region 104 defined by the cladding structure 102.

Figure 5A:
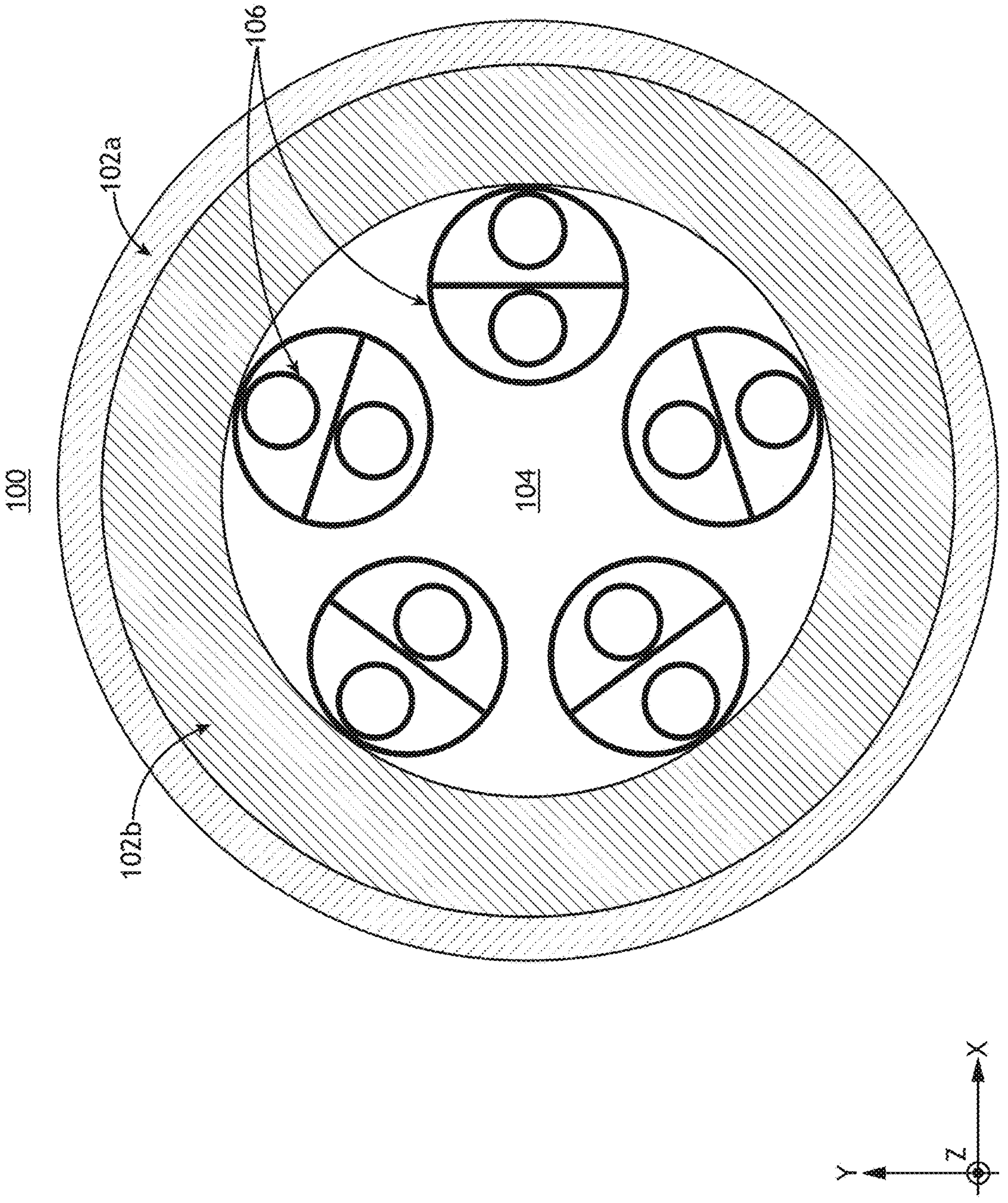
FIG. 5A is a cross-sectional view of one embodiment of an AR-HCF with a two-layer cladding structure, in accordance with one or more embodiments of the present disclosure.
Figure 5B:
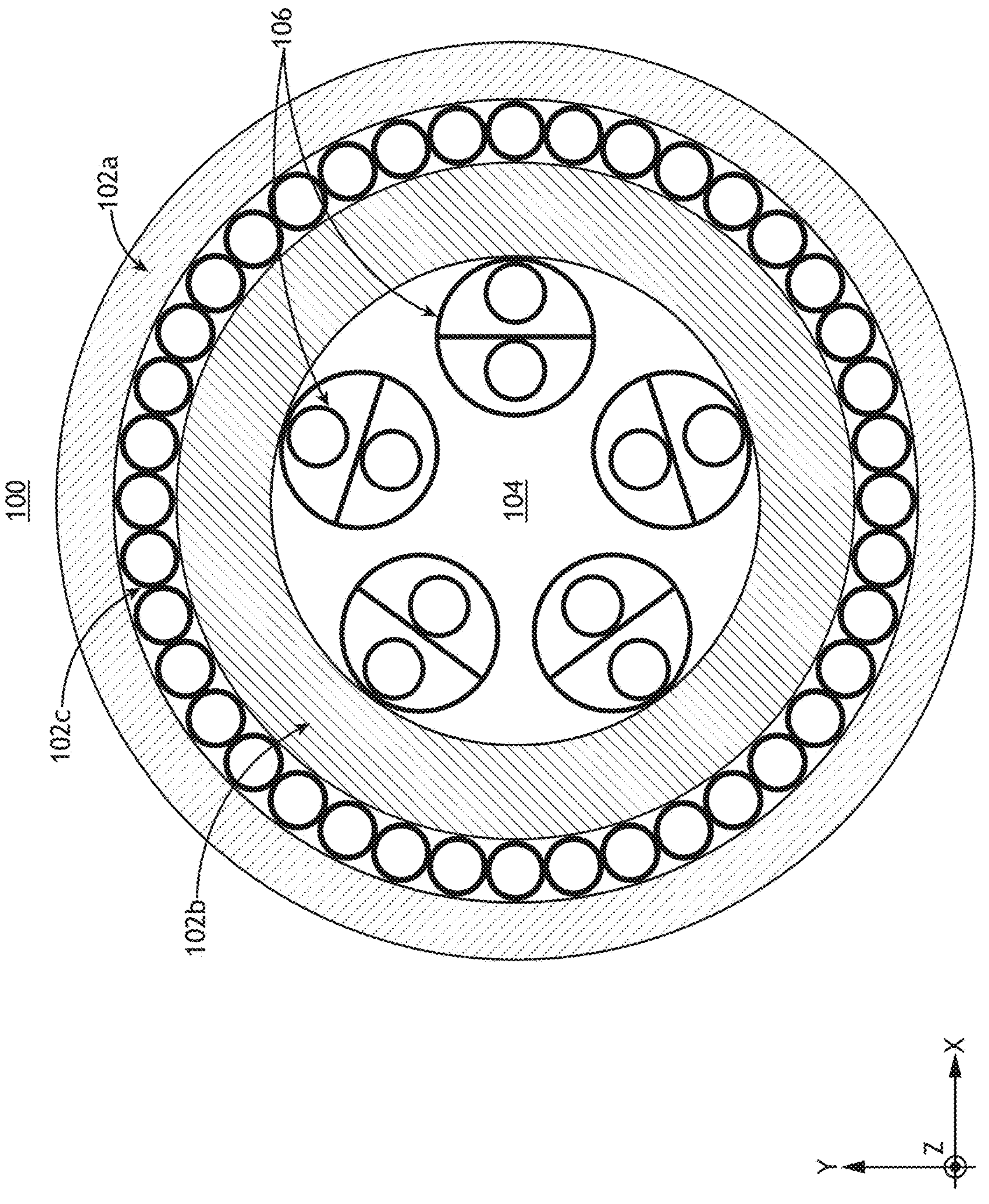
FIG. 5B is a cross-sectional view of one embodiment of an AR-HCF with multiple cladding structures, in accordance with one or more embodiments of the present disclosure.

Referring now to FIGS. 5A-5B, the cladding structures 102 are described in greater detail, in accordance with one or more embodiments of the present disclosure. The AR-HCFs 100 in FIGS. 5A-5B include nested sets of AR elements 106 as depicted in FIG. 1A, but this is merely illustrative and not limiting.

An AR-HCF 100 may generally have any number of cladding structures 102 that bound or otherwise define a hollow interior guiding region 104. Further, the cladding structures 102 (e.g., outer, interior, and/or perimeter cladding structures) may have any cross-sectional shape including, but not limited to, a circle, an ellipse, a square, a pentagon, a hexagon, a heptagon, an octagon, or the like. In some embodiments, a cladding structure 102 is formed as a tube (e.g., having an annular cross-section). As an illustration, FIGS. 1A-4C each depict an AR-HCF 100 having a single cladding structure 102 formed as a tube.

In some embodiments, one or more cladding structures 102 are formed as a multi-layer tube (e.g., a tube having multiple layers of material of the same or different composition). Such a structure may have any number of layers. Further, each of the layers may be referred to as separate cladding structures 102. FIG. 5A is a cross-sectional view of one embodiment of an AR-HCF 100 with a two-layer cladding structure 102, in accordance with one or more embodiments of the present disclosure. In particular, FIG. 5A depicts a first cladding structure 102*a* as a first layer and a second cladding structure 102*b* as a second layer.

In some embodiments, an AR-HCF 100 includes one or more additional cladding structures 102 between tube structures (e.g., layers of a multi-layer tube). FIG. 5B is a cross-sectional view of one embodiment of an AR-HCF 100 with multiple cladding structures 102, in accordance with one or more embodiments of the present disclosure. In FIG. 5B, the AR-HCF 100 includes a first cladding structure 102*a* formed as an outer tube, a second cladding structure 102*b* formed as an inner tube, and a series of additional cladding structures 102*c* between the first cladding structure 102*a* and the second cladding structure 102*b*. In particular, the additional cladding structures 102*c* in FIG. 5B are shown as tubes. However, this is merely illustrative and not limiting. The additional cladding structures 102*c* may have any cross-sectional shape or dimensions such as, but not limited to, circles, ellipses, squares, pentagons, hexagons, heptagons, octagons, or the like and may further be solid, porous, or fabricated as tubes. Further, the additional cladding structures 102*c* may be solid, porous, or may have one or more air gaps that extend along the fiber length.

Referring now to FIGS. 6A-6G, in some embodiments, an AR-HCF 100 may include various additional structures that extend along the fiber length. Such structures may have various functions such as, but not limited to, further positioning and/or supporting one or more AR elements 106 (or sets of AR elements 106), operating as AR elements 106 themselves, operating as polarization-controlling elements, operating to increase a confinement factor of guided light, operating to increase a mechanical stability of the fiber, operating to increase a robustness to bending, or the like. Further such additional structures may be formed from any suitable material and may generally have any shape, design (e.g., solid, walled, porous, or the like), and may or may not include air gaps extending along the fiber length. It is also noted that the AR-HCFs 100 in FIGS. 6A-6G include nested sets of AR elements 106 as depicted in FIG. 1A, but this is merely illustrative and not limiting. In some embodiments, an AR-HCF 100 includes one or more additional structures that are connected to an AR element 106, but do not position the AR element 106.

Figure 6A:
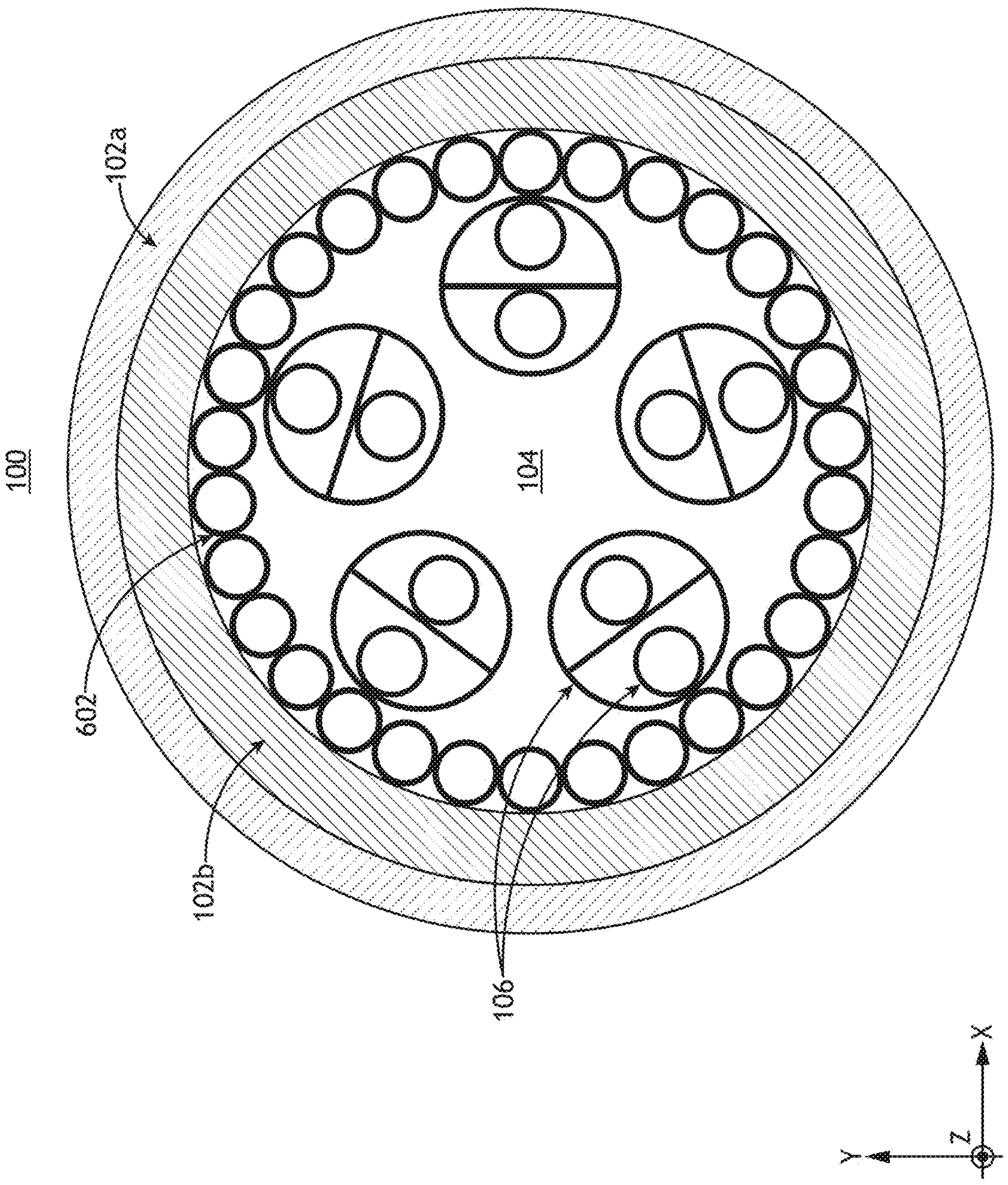
FIG. 6A is a cross-sectional view of one embodiment of an AR-HCF with a ring of perimeter structures around a perimeter of the hollow interior guiding region 104 shaped as tubes, in accordance with one or more embodiments of the present disclosure.
Figure 6B:
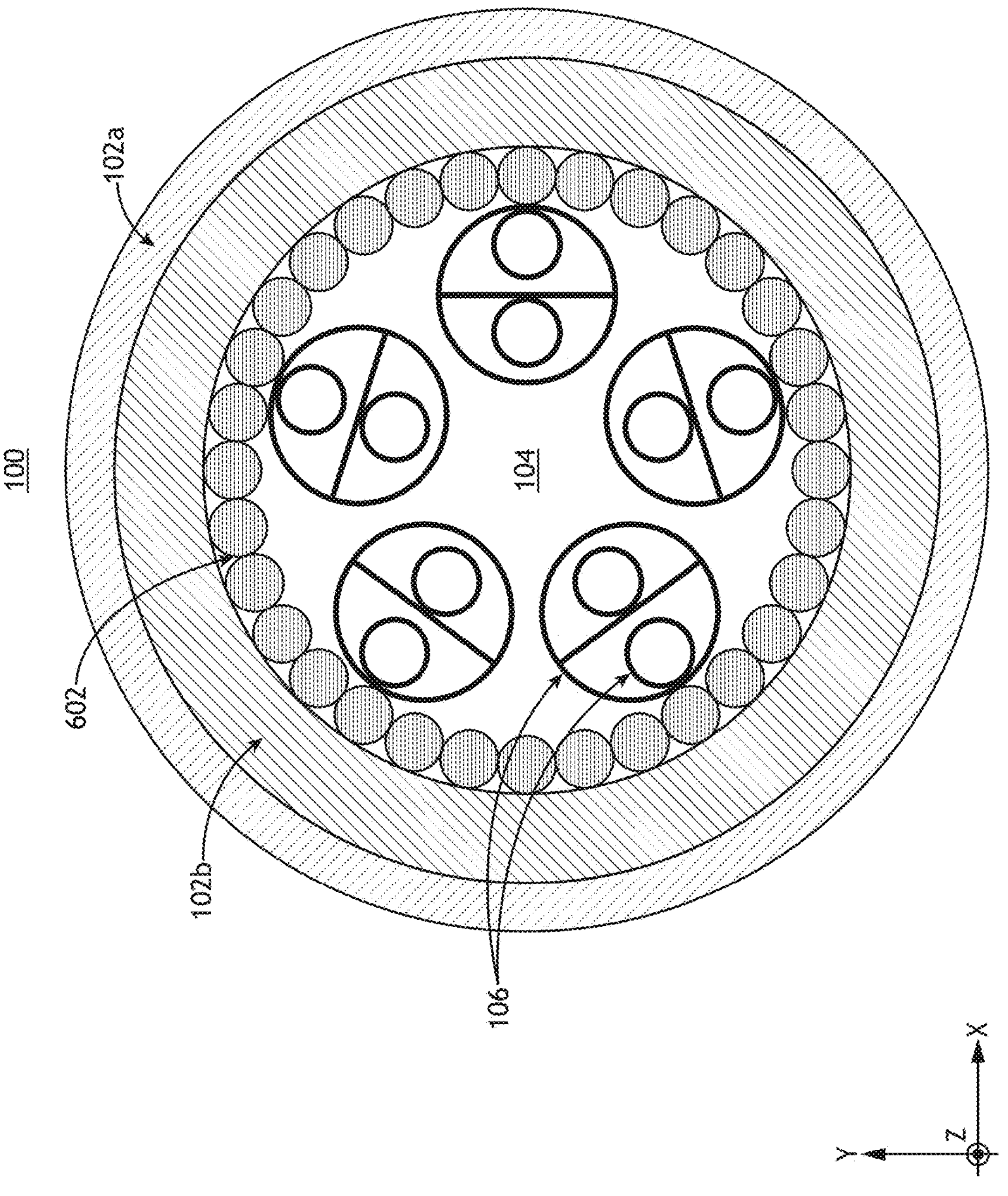
FIG. 6B is a cross-sectional view of one embodiment of an AR-HCF with a ring of perimeter structures shaped as solid rods, in accordance with one or more embodiments of the present disclosure.
Figure 6C:
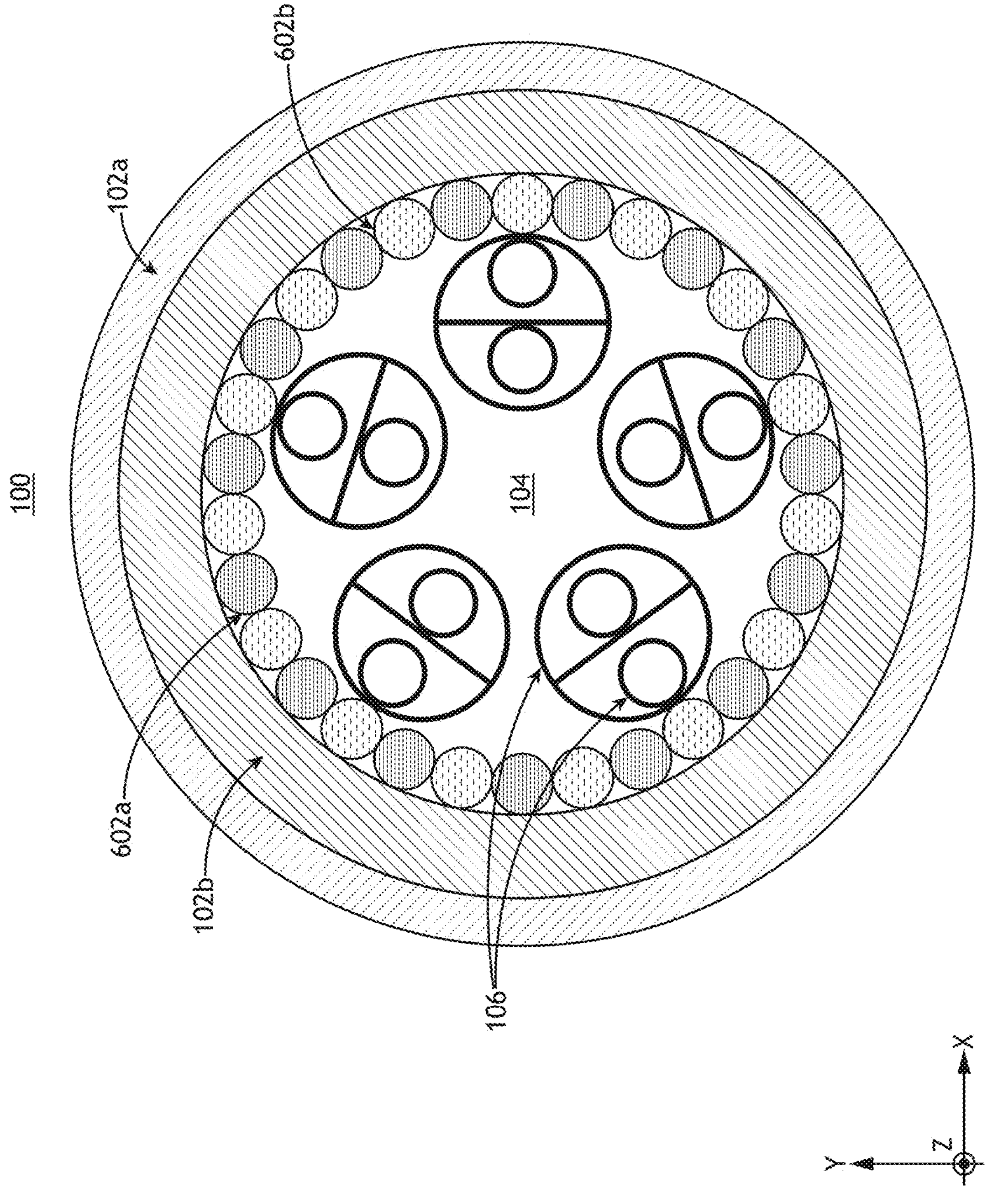
FIG. 6C is a cross-sectional view of one embodiment of an AR-HCF with a ring of perimeter structures shaped as solid rods with alternating compositions, in accordance with one or more embodiments of the present disclosure.

FIG. 6A is a cross-sectional view of one embodiment of an AR-HCF 100 with a ring of perimeter structures 602 around a perimeter of the hollow interior guiding region 104 shaped as tubes, in accordance with one or more embodiments of the present disclosure. FIG. 6B is a cross-sectional view of one embodiment of an AR-HCF 100 with a ring of perimeter structures 602 shaped as solid rods, in accordance with one or more embodiments of the present disclosure. FIG. 6C is a cross-sectional view of one embodiment of an AR-HCF 100 with a ring of perimeter structures 602 shaped as solid rods with alternating compositions (labeled as 602*a* and 602*b*, respectively), in accordance with one or more embodiments of the present disclosure.

FIGS. 6D-6G show additional non-limiting designs of an AR-HCF 100 with perimeter structures 602 that do not fully cover the perimeter of the hollow interior guiding region 104.

Figure 6D:
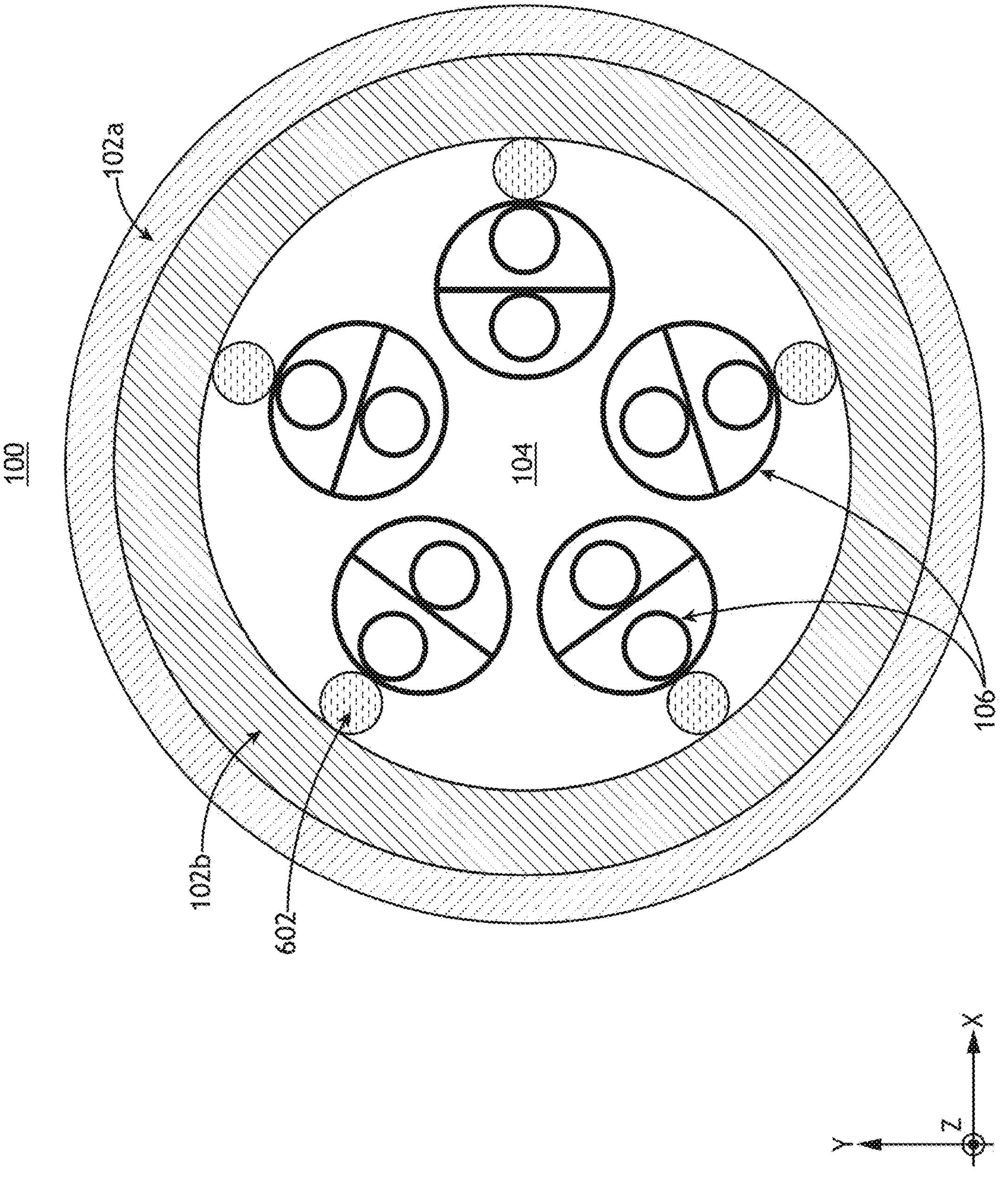
FIG. 6D is a cross-sectional view of one embodiment of an AR-HCF with a first pattern of perimeter structures, in accordance with one or more embodiments of the present disclosure.

FIG. 6D is a cross-sectional view of one embodiment of an AR-HCF 100 with a first pattern of perimeter structures 602, in accordance with one or more embodiments of the present disclosure. In FIG. 6D, the AR-HCF 100 includes a perimeter structure 602 between each of the nested sets of AR elements 106 and the cladding structures 102. Such perimeter structures 602 may thus operate as support structures and may position the nested sets of AR elements 106 within the hollow interior guiding region 104, modify the optical properties of the AR-HCF 100, or the like.

Figure 6E:
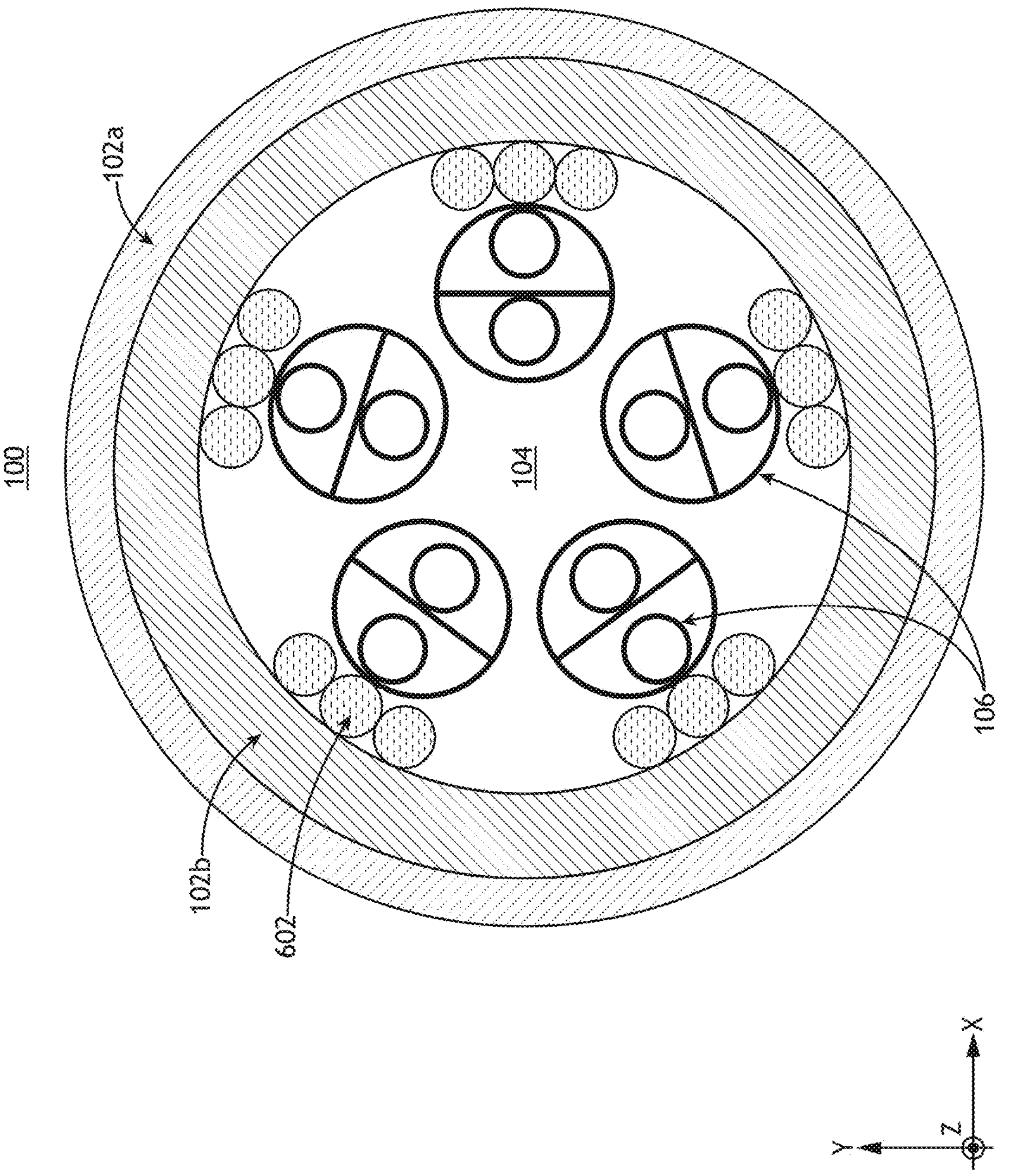
FIG. 6E is a cross-sectional view of one embodiment of an AR-HCF with a first pattern of perimeter structures, in accordance with one or more embodiments of the present disclosure.
Figure 6F:
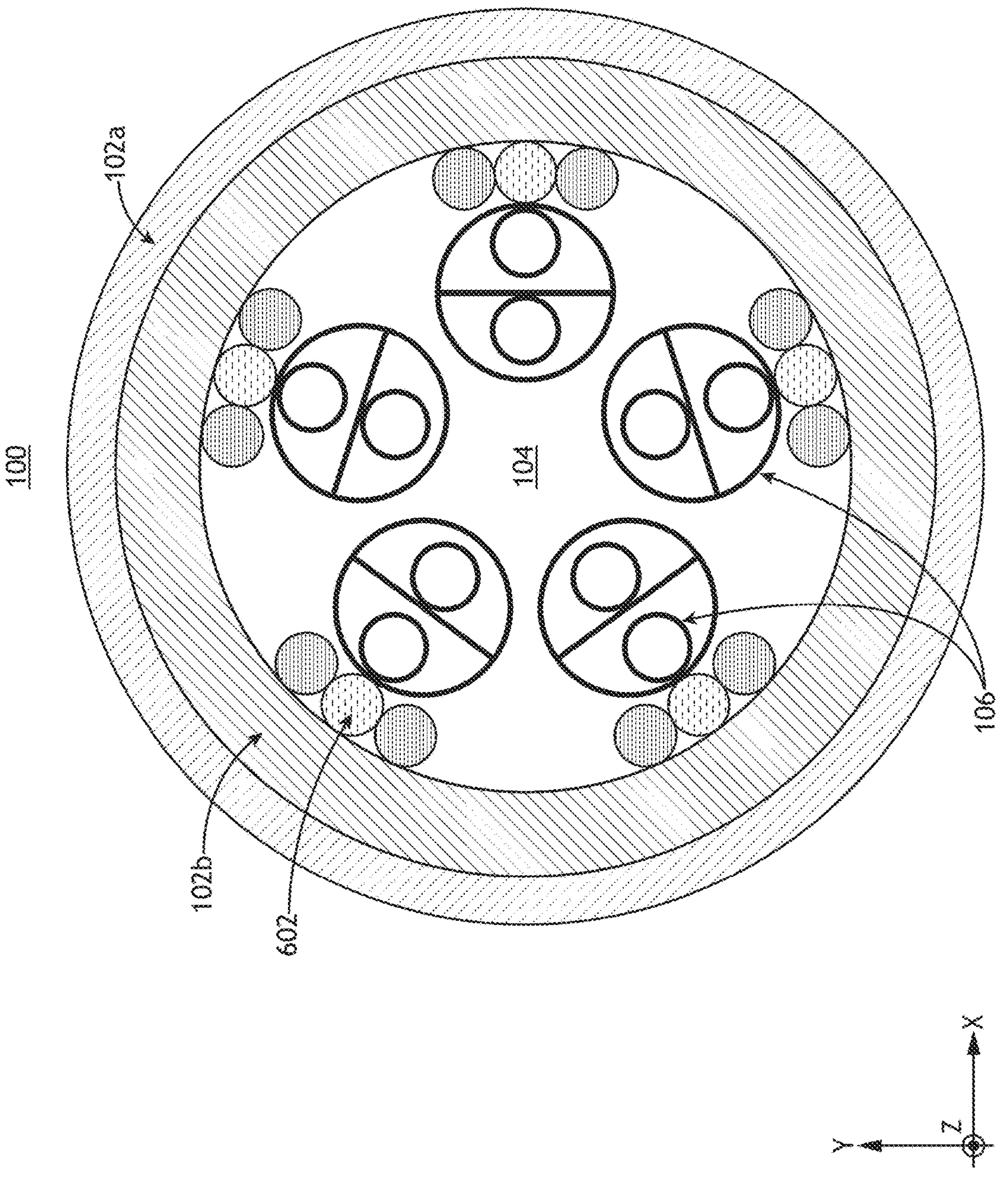
FIG. 6F is a cross-sectional view of one embodiment of an AR-HCF with a second pattern of perimeter structures, in accordance with one or more embodiments of the present disclosure.

FIG. 6E is a cross-sectional view of one embodiment of an AR-HCF 100 with a first pattern of perimeter structures 602, in accordance with one or more embodiments of the present disclosure. In FIG. 6E, the AR-HCF 100 includes sets of three perimeter structures 602 near each set of AR elements 106. FIG. 6F is a cross-sectional view of one embodiment of an AR-HCF 100 with a second pattern of perimeter structures 602 (e.g., with different compositions), in accordance with one or more embodiments of the present disclosure.

Figure 6G:
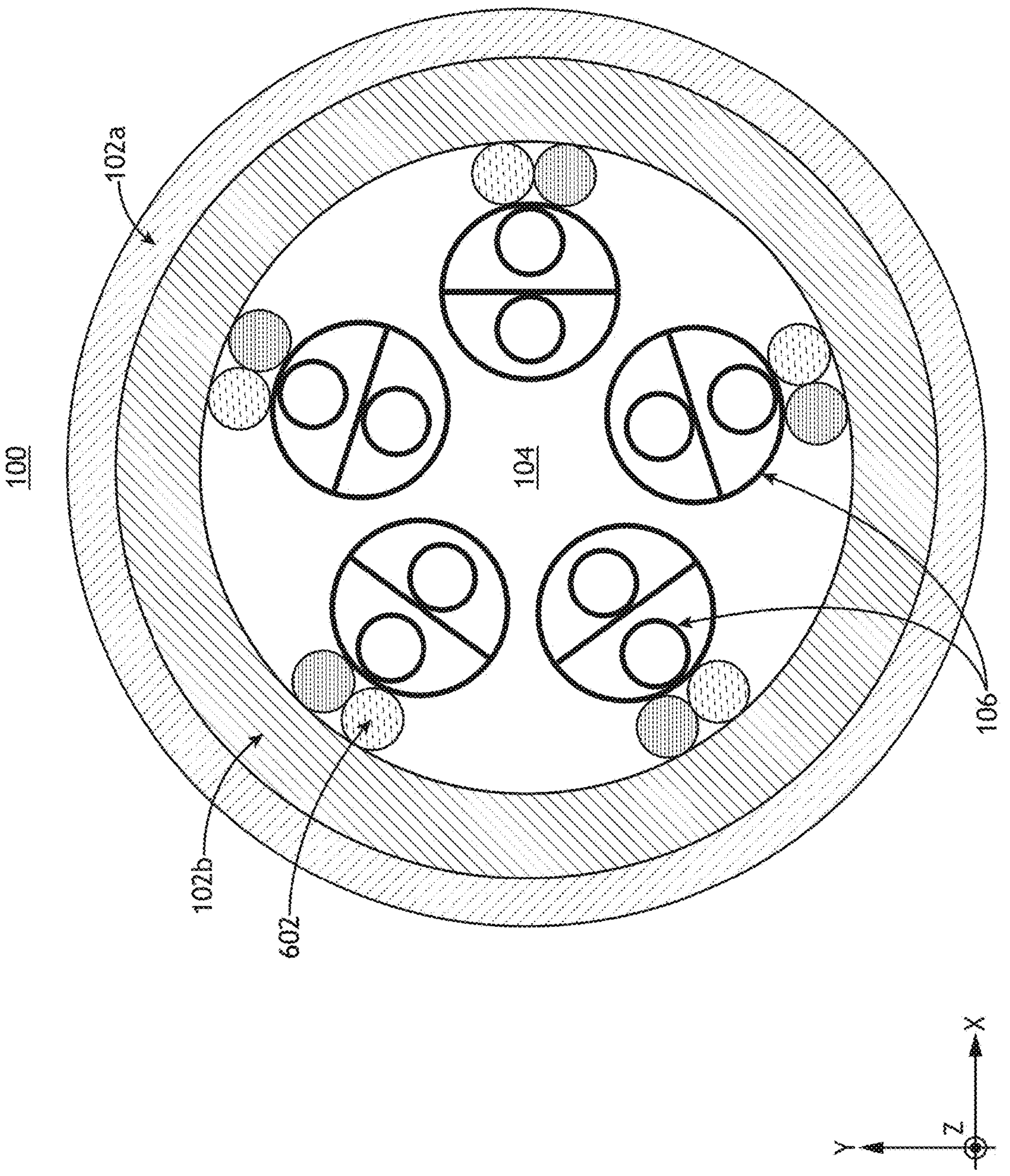
FIG. 6G is a cross-sectional view of one embodiment of an AR-HCF with additional structures, each connected to a single element, in accordance with one or more embodiments of the present disclosure.

FIG. 6G is a cross-sectional view of one embodiment of an AR-HCF 100, in accordance with one or more embodiments of the present disclosure.

Referring generally to FIGS. 1A-6G, additional aspects of the design of nested AR elements 106 are described in greater detail.

A set of nested AR elements 106 may generally have any type of symmetry, or even no symmetry. For example, the various designs of nested AR elements 106 in FIGS. 1A-6E are each mirror symmetric relative to a radial line from a center of the AR-HCF 100. However, this is merely an illustration and not limiting on the scope of the present disclosure. For example, a nested set of AR elements 106 may possess any form of mirror and/or rotational symmetry along any direction or directions. As another example, a nested set of AR elements 106 may be asymmetric.

Figure 7A:
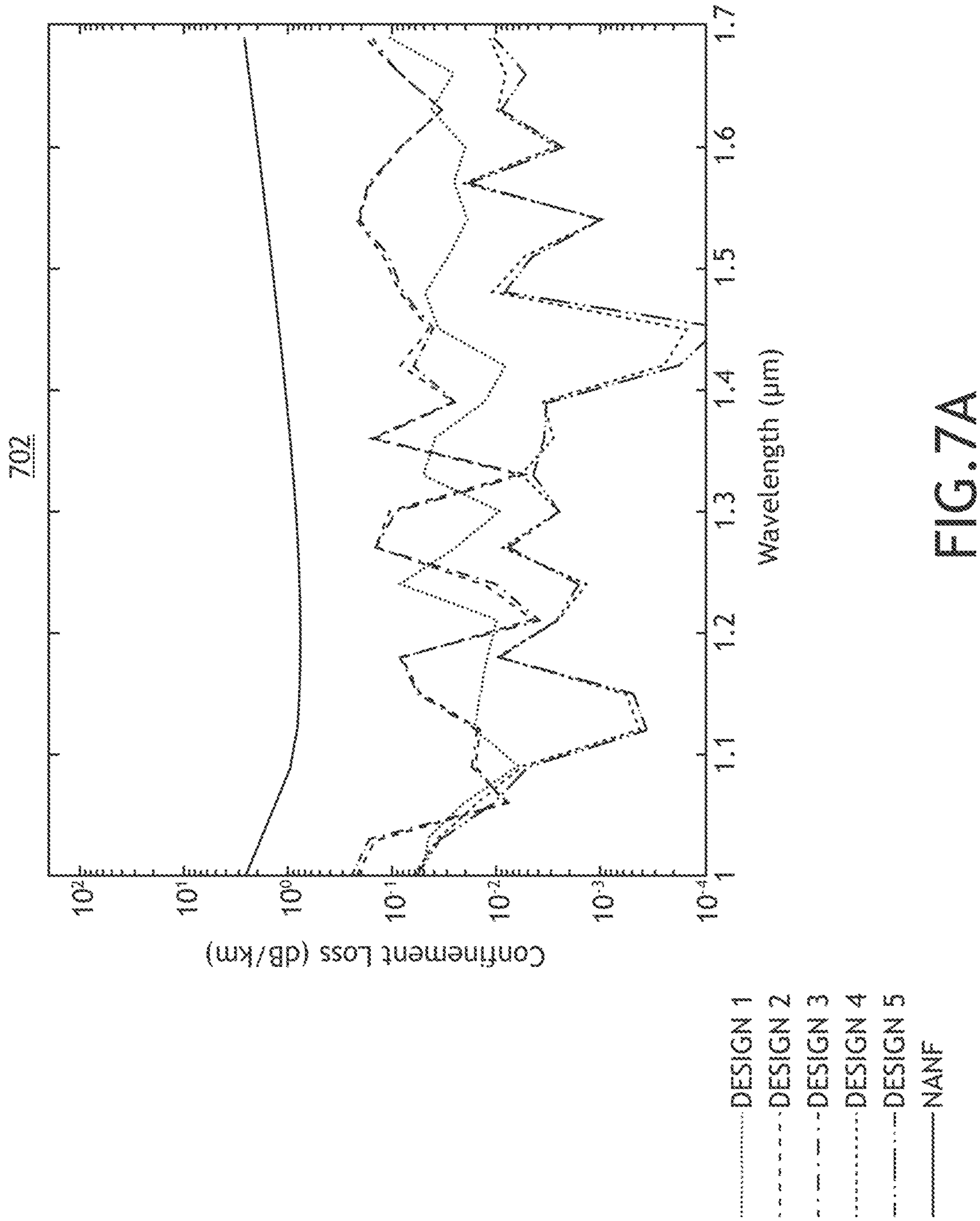
FIG. 7A illustrates a plot of confinement loss for various fiber designs, in accordance with one or more embodiments of the present disclosure.
Figure 7B:
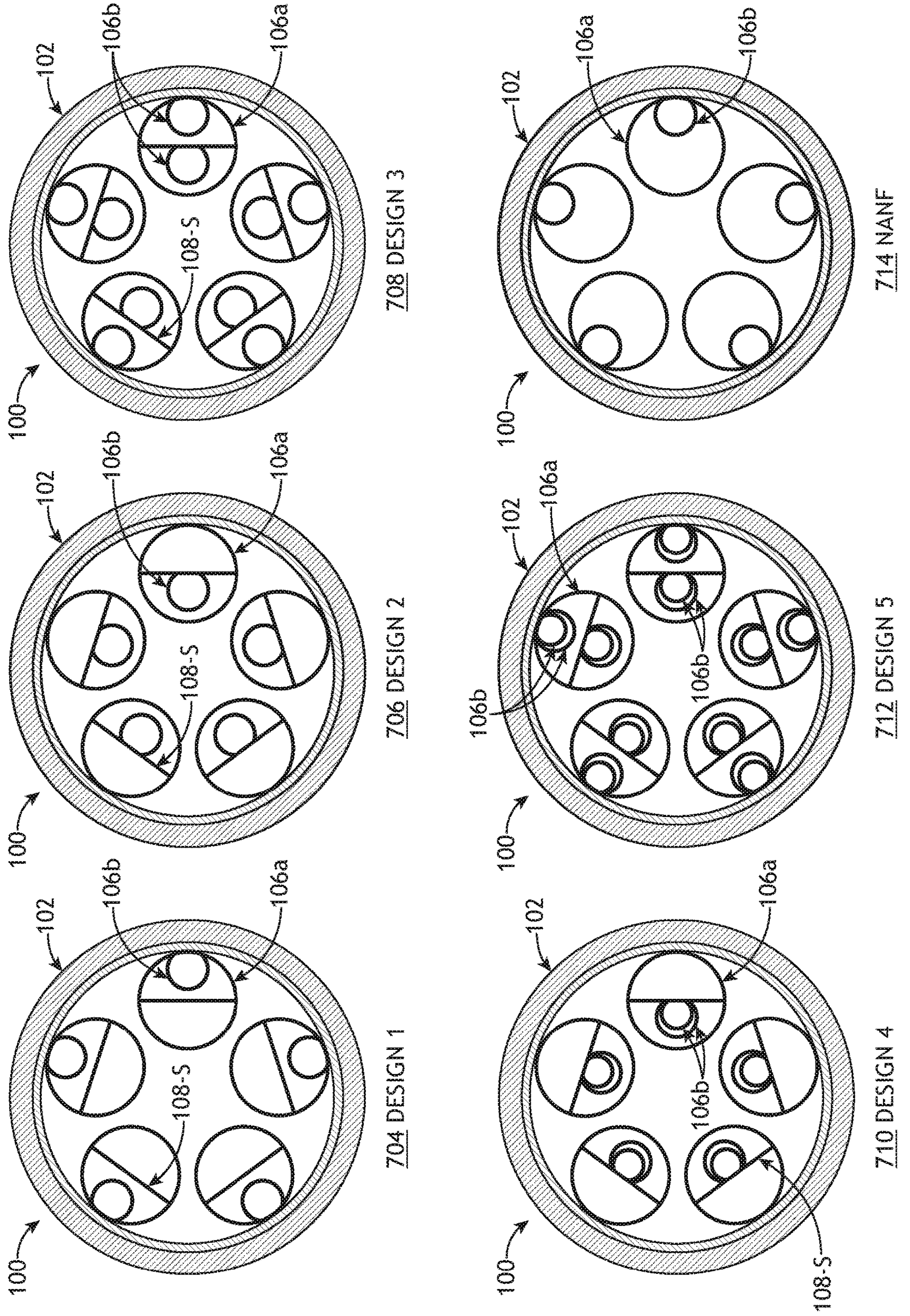
FIG. 7B illustrates cross-sections of the simulated designs in FIG. 7A, in accordance with one or more embodiments of the present disclosure.
Figure 8:
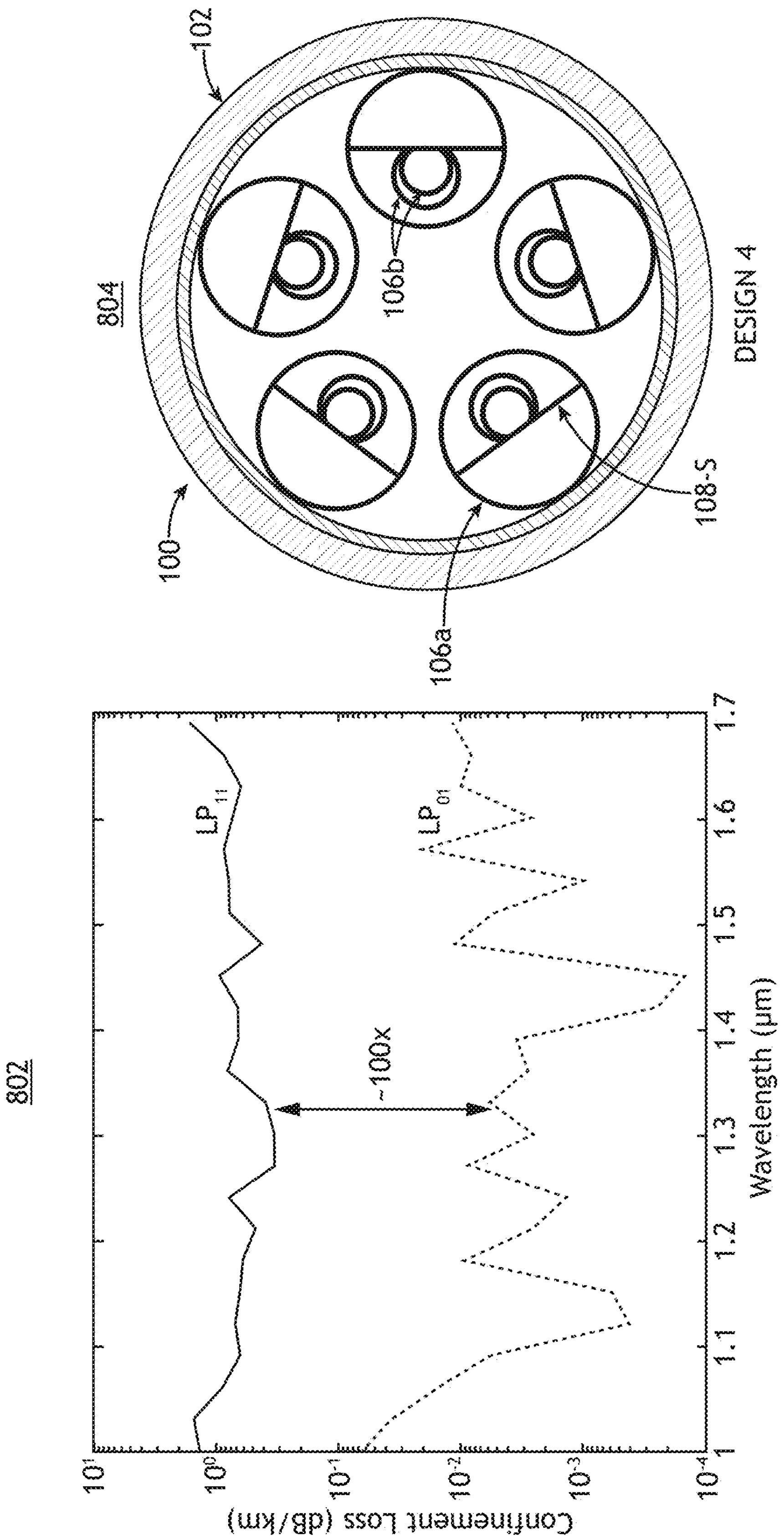
FIG. 8 is a plot of confinement losses for the fundamental mode and higher-order modes for an AR-HCF based on the fourth design in FIG. 7, in accordance with one or more embodiments of the present disclosure.

Referring now to FIGS. 7A-8, the simulated performance of various designs of an AR-HCF 100 based on the systems and methods disclosed herein are described. For the simulations, each of the AR-HCFs 100 are formed from silica glass.

FIG. 7A illustrates a plot 702 of confinement loss for various fiber designs, in accordance with one or more embodiments of the present disclosure. FIG. 7B illustrates cross-sections of the simulated designs in FIG. 7A, in accordance with one or more embodiments of the present disclosure. A first design 704 (e.g., Design 1) includes a single second AR element **106*b* in a first interior cavity 110*a* of a first AR element 106*a*. A second design 706 (e.g., Design 2) includes a single second AR element 106*b* in a second interior cavity 110*b* of a first AR element 106*a*. A third design 708 (e.g., Design 3) includes second AR elements 106*b* in both a first interior cavity 110*a* and a second interior cavity 110*b* of a first AR element 106*a*. A fourth design 710 (e.g., Design 4) includes a second AR element 106*b* within the second interior cavity 110*b* and a third AR element 106*c* within the second AR element 106*b*. In a fifth design 712 (e.g., Design 5), both a first interior cavity 110*a* and a second interior cavity 110*b* include a second AR element 106*b* and a third AR element 106*c* within the second AR element 106*b*. A sixth design 714 does not include segmentation walls 108-S for segmentation and is referred to as a nested AR nodeless fiber (NANF) design. It is noted that all of the designs depicted in FIG. 7B include truncated AR elements 106**.

As shown in plot 702, Designs 1-5 including segmentation walls 108-S for segmentation and nested AR elements 106 substantially outperform the NANF design, with Designs 4 and 5 with multiple cascading AR elements 106 performing particularly well in this simulation.

FIG. 8 is a plot 802 of confinement losses for the fundamental mode (LP01) and higher-order modes (LP11) for an AR-HCF 100 based on the fourth design (Design 4) in inset 804, in accordance with one or more embodiments of the present disclosure. As depicted in plot 802, the confinement loss of the fundamental mode (LP01) is approximately 2-3 orders of magnitude lower than the higher-order modes, which may provide excellent fundamental mode performance.

Referring generally to FIGS. 1A-8, it is emphasized that any of the features of an AR-HCF 100 such as, but not limited to, AR elements 106 or the interior cavities 110 formed through segmentation may have any cross-sectional shape such as, but not limited to, a circle, an ellipse, a triangle, a square, a pentagon, a hexagon, a heptagon, an octagon, or the like. Any such shapes may be complete or truncated. Further, any of the AR elements 106 may be segmented to provide any number of interior cavities 110, where the interior cavities 110 may have any shape or size. Further, the various interior cavities 110 within an AR element 106 may have the same or unequal sizes and/or shapes. In this way, the specific designs provided herein are merely illustrative and not limiting.

Figure 9A:
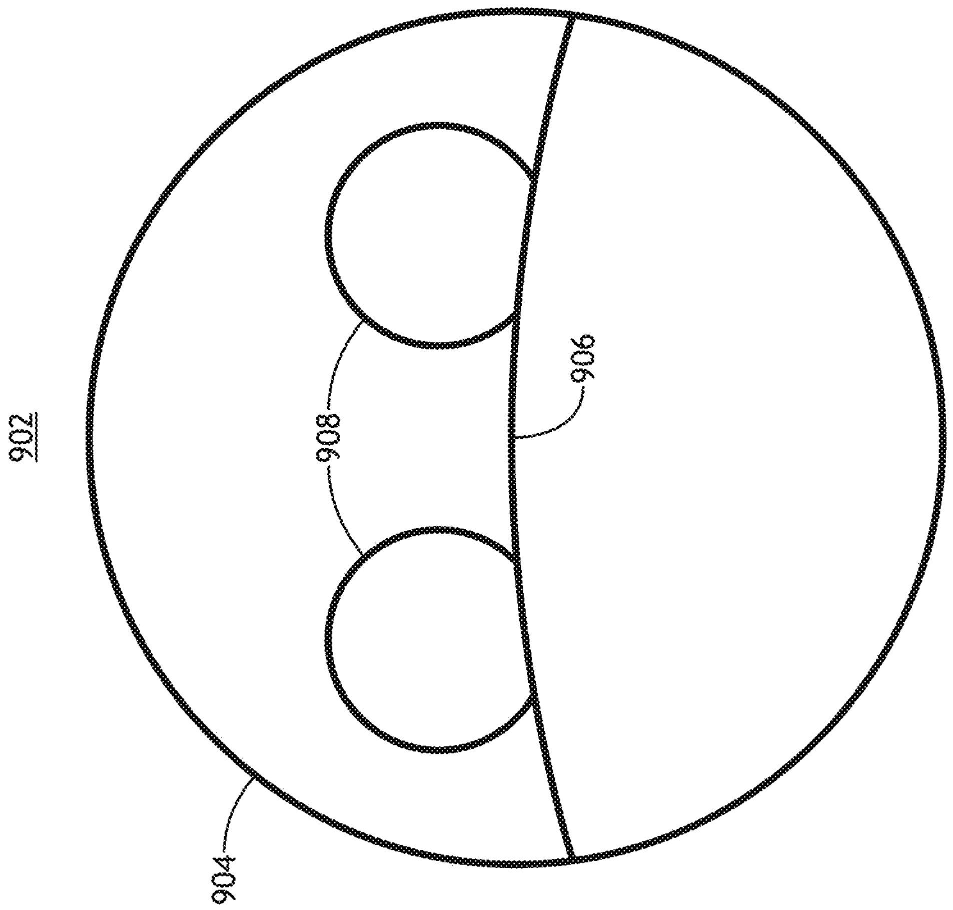
FIG. 9A is a cross-sectional view of one embodiment of a preform element associated with the design of nested AR elements depicted in FIG. 1F, in accordance with one or more embodiments of the present disclosure.
Figure 9B:
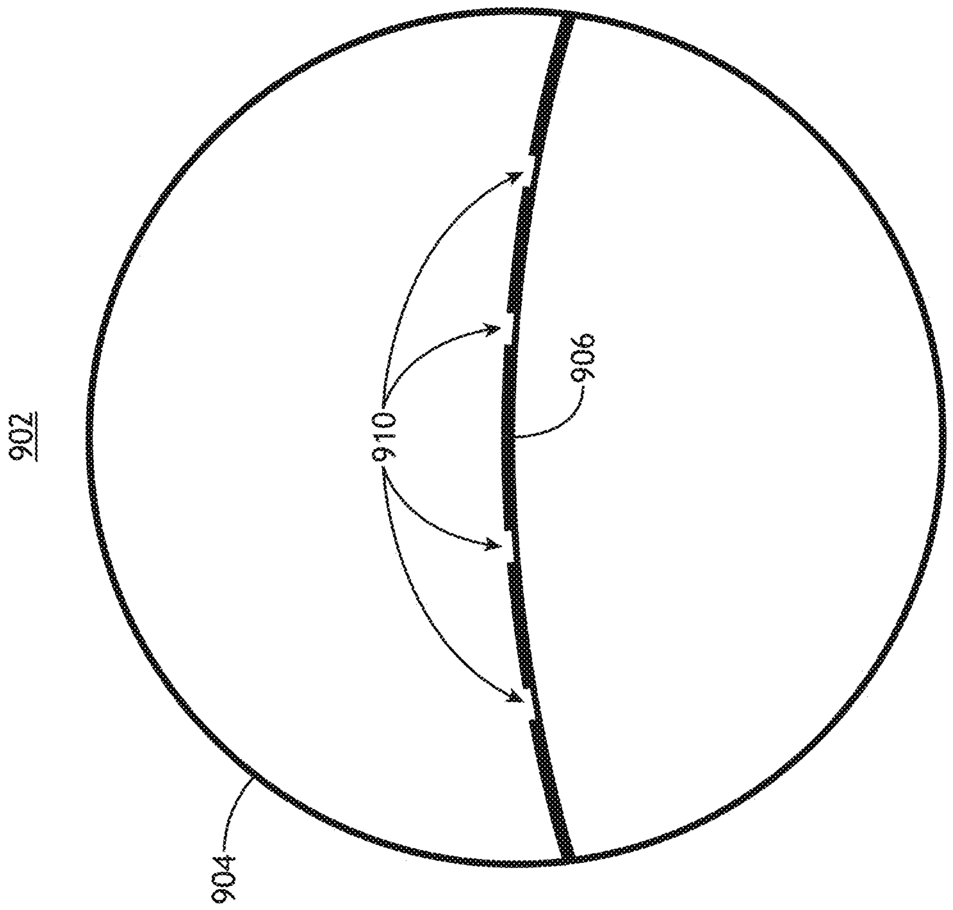
FIG. 9B is a cross-sectional view of one embodiment of the preform element including notched alignment structures within the segmentation structure, in accordance with one or more embodiments of the present disclosure.

Referring now to FIGS. 9A-9B, preforms for fabricating nested sets of AR elements 106 are described in greater detail.

In some embodiments, a preform for an AR-HCF 100 includes a series of preform elements arranged to provide a selected design of the AR-HCF 100 after a draw process. Such preform elements may be connected to form the preform using any technique known in the art including, but not limited to, a mechanical technique, a chemical technique, or an optical technique (e.g., laser welding). It is contemplated herein that the preform need not have the same design as the selected design of the AR-HCF 100. Rather, factors such as surface tension, pressurization of any interior cavities 110 and/or the hollow interior guiding region 104 may distort the preform during a draw process. Further, such distortions may be accounted for when designing the preform such that the final AR-HCF 100 has the selected design.

As an illustration, FIG. 9A is a cross-sectional view of one embodiment of a preform element 902 associated with the design of nested AR elements 106 depicted in FIG. 1F, in accordance with one or more embodiments of the present disclosure. For example, the preform element 902 may include an outer section 904 that will provide a first AR element **106*a* after a draw process, a segmentation structure 906 that will form a segmentation wall 108-S after the draw process, and two additional structures 908 that will form the second AR elements 106*b* after the draw process. Notably, the segmentation structure 906 is curved in FIG. 9A, but may form a straight segmentation wall 108-S (e.g., as shown in FIG. 1F**) during the draw process due to surface tension and/or pressurization during the draw process.

Further, a full preform (not shown) for forming the full AR-HCF 100 depicted in FIG. 1F may include five instances of the preform element 902 arranged around an additional tubular preform element (also not shown).

In some embodiments, a preform includes one or more alignment structures 910 to facilitate mechanical alignment and/or stability of the preform element 902. For example, alignment structures 910 may include notches, grooves, or any other structure. As an illustration, FIG. 9B is a cross-sectional view of one embodiment of the preform element 902 including notched alignment structures 910 within the segmentation structure 906, in accordance with one or more embodiments of the present disclosure. For clarity, the additional structures 908 are not shown in FIG. 9B. In some embodiments, endpoints of the additional structures 908 fit within the notched alignment structures 910. In this way, the positions of the additional structures 908 may be precisely positioned.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical fiber comprising:

a cladding structure extending along a fiber length providing a hollow interior fiber region; and a plurality of anti-resonant (AR) elements distributed within the hollow interior fiber region, each of the plurality of AR elements formed as walled structures with walls extending along the fiber length, wherein at least some of the plurality of AR elements are nested to form one or more nested sets of AR elements, wherein at least one of the nested sets of AR elements comprises a first AR element of the plurality of AR elements, wherein an interior region of the first AR element is segmented into two or more interior cavities by one or more segmentation walls extending along the fiber length, wherein at least one of the two or more interior cavities of the first AR element includes two or more second AR elements of the plurality of AR elements, wherein the plurality of AR elements is configured to guide light along the fiber length at least partially within the hollow interior fiber region based on optical antiresonance.

2. The optical fiber of claim 1, wherein the two or more interior cavities have non-circular cross-sectional shapes.

3. The optical fiber of claim 1, wherein a ratio of a cross-sectional area of each of the two or more interior cavities relative to a cross-sectional area of the interior region of the first AR element is greater than or equal to a selected threshold.

4. The optical fiber of claim 3, wherein the selected threshold expressed as a percentage is 10%.

5. The optical fiber of claim 1, wherein a relative circumferential distance associated with a ratio between a separation distance of endpoints of any of the one or more segmentation walls along a circumference of the first AR element to the circumference of the first AR element is greater than or equal to a selected threshold.

6. The optical fiber of claim 5, wherein the selected threshold expressed as a percentage is 10%.

7. The optical fiber of claim 1, wherein at least one of the one or more segmentation walls is another AR element that contributes to the guiding of the light along the fiber length at least partially within the hollow interior fiber region based on optical antiresonance.

8. The optical fiber of claim 1, wherein at least one of the plurality of AR elements includes one or more support structures formed as at least a portion of at least one of the walls of at least one of the plurality of AR elements, wherein the one or more support structures have non-uniform thickness profiles.

9. The optical fiber of claim 1, wherein the interior region of the first AR element is segmented into three or more interior cavities by two or more segmentation walls extending along the fiber length.

10. The optical fiber of claim 1, further comprising:

one or more third AR elements nested within an interior cavity of at least one of the two or more second AR elements.

11. The optical fiber of claim 1, further comprising:

one or more third AR elements nested within an interior cavity of at least one of the two or more second AR elements.

12. The optical fiber of claim 1, further comprising:

one or more additional structures connected to the cladding structure.

13. The optical fiber of claim 12, wherein at least one of the one or more nested sets of AR elements is connected to at least one of the one or more additional structures.

14. The optical fiber of claim 1, wherein the cladding structure is formed from two or more layers of material.

15. The optical fiber of claim 1, further comprising:

one or more perimeter structures between the cladding structure and at least one of the plurality of AR elements.

16. The optical fiber of claim 1, wherein the one or more nested sets of AR elements include two or more nested sets of AR elements uniformly distributed around a perimeter of the hollow interior fiber region.

17. The optical fiber of claim 1, wherein the one or more nested sets of AR elements include two or more nested sets of AR elements non-uniformly distributed around a perimeter of the hollow interior fiber region.

18. The optical fiber of claim 1, wherein the one or more nested sets of AR elements include two or more nested sets of AR elements with a common design.

19. The optical fiber of claim 1, wherein at least one of the one or more nested sets of AR elements comprises:

a first set of AR elements having a first design; and a second set of AR elements having a second design.

20. The optical fiber of claim 19, wherein the cladding structure is formed from two or more layers of material.

21. The optical fiber of claim 1, wherein the cladding structure is formed from two or more layers of material, wherein the cladding structure further includes one or more additional structures between at least two of the two or more layers of the material.

22. The optical fiber of claim 1, wherein the hollow interior fiber region is filled with a gas.

23. The optical fiber of claim 1, wherein the hollow interior fiber region is under vacuum.

24. An optical fiber comprising:

a cladding structure extending along a fiber length providing a hollow interior fiber region; and a plurality of anti-resonant (AR) elements distributed within the hollow interior fiber region, each of the plurality of AR elements formed as walled structures with walls extending along the fiber length, wherein at least some of the plurality of AR elements are nested to form one or more nested sets of AR elements, wherein at least one of the nested sets of AR elements comprises a first AR element of the plurality of AR elements, wherein an interior region of the first AR element is segmented into two or more interior cavities by one or more segmentation walls extending along the fiber length, wherein each one of the two or more interior cavities of the first AR element includes one or more second AR elements of the plurality of AR elements, wherein the plurality of AR elements is configured to guide light along the fiber length at least partially within the hollow interior fiber region based on optical antiresonance.

25. The optical fiber of claim 24, wherein the two or more interior cavities have non-circular cross-sectional shapes.

26. The optical fiber of claim 24, wherein a ratio of a cross-sectional area of each of the two or more interior cavities relative to a cross-sectional area of the interior region of the first AR element is greater than or equal to a selected threshold.

27. The optical fiber of claim 26, wherein the selected threshold expressed as a percentage is 10%.

28. The optical fiber of claim 25, wherein a relative circumferential distance associated with a ratio between a separation distance of endpoints of any of the one or more segmentation walls along a circumference of the first AR element to the circumference of the first AR element is greater than or equal to a selected threshold.

29. The optical fiber of claim 28, wherein the selected threshold expressed as a percentage is 10%.

30. The optical fiber of claim 28, wherein at least one of the one or more segmentation walls is another AR element that contributes to the guiding of the light along the fiber length at least partially within the hollow interior fiber region based on optical antiresonance.

31. The optical fiber of claim 24, wherein at least one of the plurality of AR elements includes one or more support structures formed as at least a portion of at least one of the walls of at least one of the plurality of AR elements, wherein the one or more support structures have non-uniform thickness profiles.

32. The optical fiber of claim 24, wherein the interior region of the first AR element is segmented into three or more interior cavities by two or more segmentation walls extending along the fiber length.

33. The optical fiber of claim 24, further comprising:
one or more third AR elements nested within an interior cavity of at least one of the one or more second AR elements.

34. The optical fiber of claim 24, further comprising:
one or more third AR elements nested within an interior cavity of at least one of the one or more second AR elements.

35. The optical fiber of claim 24, further comprising:
one or more additional structures connected to the cladding structure.

36. The optical fiber of claim 35, wherein at least one of the one or more nested sets of AR elements is connected to at least one of the one or more additional structures.

37. The optical fiber of claim 24, wherein the cladding structure is formed from two or more layers of material.

38. The optical fiber of claim 24, further comprising:
one or more perimeter structures between the cladding structure and at least one of the plurality of AR elements.

39. The optical fiber of claim 24, wherein the one or more nested sets of AR elements include two or more nested sets of AR elements uniformly distributed around a perimeter of the hollow interior fiber region.

40. The optical fiber of claim 24, wherein the one or more nested sets of AR elements include two or more nested sets of AR elements non-uniformly distributed around a perimeter of the hollow interior fiber region.

41. The optical fiber of claim 24, wherein the one or more nested sets of AR elements include two or more nested sets of AR elements with a common design.

42. The optical fiber of claim 24, wherein at least one of the one or more nested sets of AR elements comprises:
a first set of AR elements having a first design; and
a second set of AR elements having a second design.

43. The optical fiber of claim 42, wherein the cladding structure is formed from two or more layers of material.

44. The optical fiber of claim 24, wherein the cladding structure is formed from two or more layers of material, wherein the cladding structure further includes one or more additional structures between at least two of the two or more layers of the material.

45. The optical fiber of claim 24, wherein the hollow interior fiber region is filled with a gas.

46. The optical fiber of claim 24, wherein the hollow interior fiber region is under vacuum.

* * * * *